(12) United States Patent
Otsuji

(10) Patent No.: US 7,291,955 B2
(45) Date of Patent: Nov. 6, 2007

(54) MOTOR STATOR TEETH WITH INSULATORS

(75) Inventor: Motofumi Otsuji, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/161,249

(22) Filed: Jul. 27, 2005

(65) Prior Publication Data

US 2006/0022550 A1    Feb. 2, 2006

(30) Foreign Application Priority Data

Jul. 27, 2004    (JP) .............................. 2004-218197
Jul. 4, 2005     (JP) .............................. 2005-194673

(51) Int. Cl.
*H02K 3/18*     (2006.01)
*H02K 3/46*     (2006.01)
*H02K 15/095*   (2006.01)

(52) U.S. Cl. ................. 310/194; 310/216; 310/254

(58) Field of Classification Search ................ 310/194, 310/216, 217, 218, 254
See application file for complete search history.

(56) References Cited

U.S. PATENT DOCUMENTS

2003/0098630 A1* 5/2003 Owada et al. .............. 310/259
2004/0263015 A1  12/2004 Okada et al.
2006/0022550 A1* 2/2006 Otsuji ........................ 310/216

FOREIGN PATENT DOCUMENTS

| JP | 04312336    A * | 11/1992 |
| JP | H11-299132  A   | 10/1999 |
| JP | 2002-284446 A   | 10/2002 |
| JP | 3498129      B2 | 12/2003 |
| JP | 2004-072970 A   | 3/2004  |
| JP | 2004-140964 A   | 5/2004  |
| WO | WO 03021744 A1* | 3/2003  |

* cited by examiner

*Primary Examiner*—Karl Tamai
*Assistant Examiner*—David W. Scheuermann
(74) *Attorney, Agent, or Firm*—Keating & Bennett, LLP

(57) ABSTRACT

A motor stator in one implementation includes a plurality of teeth disposed in a radial form centered about a predetermined center axis, insulators covering the plurality of teeth, and a plurality of coils provided on each of said plurality of teeth by winding conductors onto the insulators through to multiple layers. At one axial end of the plurality of areas where the insulators cover each of the plurality of teeth, the radius of curvature of the conductor windings on the ending side is larger than the radius of curvature on the starting side. The insulators in a motor stator in another implementation are provided with a first partition and a second partition that, relative to the axial center of the plurality of teeth, respectively cover one side and the other side each tooth.

3 Claims, 18 Drawing Sheets

MOTOR STATOR TEETH WITH INSULATORS

BACKGROUND OF THE INVENTION

1. Technical Field

The present invention relates to electrically powered motors, and in particular, to stators.

2. Description of the Related Art

Electrically powered motors to date have been furnished with a stator, and with magnetic-field producing magnets, which are the drive part that rotates a motor's rotor section relative to its stator section. Stators include an annular core, insulators as nonconducting components that cover teeth sections of the core, and coils formed by wrapping conductors onto the insulators. In midsized motors such as are used for "electric power steering systems" (as termed in, for example, U.S. Pat. App. Pub. No. 2002/0175574, but also referred to as "steer-by-wire systems"), conductors of relatively large diameter are wrapped around insulators and employed as the coils.

In such motors, owing to the fact that motor efficiency increases with conductor diameter, technology for improving the slot-fill factor of the coils by wrapping on the conductors in regular rows without gaps is paramount. In the present specification, the term "space factor" (as termed in, for example, paragraph [0006] of both U.S. Pat. App. Pub. No. 2004/0263015 and Pat. App. Pub. No. 2005/0029894, but also referred to as "slot-fill factor," or "slot-fill ratio") is intended to mean the ratio of the area occupied by the conductors with respect to the cross-sectional area in the interval (slot) between adjoining stator teeth.

In stator implementations employing large-diameter conductors that do not bend readily, when the conductors are wound onto the teeth, it can happen that a conductor, as wrapped onto a tooth from one flank to the other flank, does not bend fully around a terminus of the tooth, and is instead left riding up off the tooth, not lying in full contact along the flanks. For example, in stator implementations in which the insulators are formed with tooth-flank guide grooves, it can happen that the conductors fail to be guided by the guide grooves, which is prohibitive not only of attaining evenly-rowed wrapping but also of smooth conductor windings, and limits improvement in the slot-fill factor of the coils.

BRIEF SUMMARY OF THE INVENTION

The present invention makes it possible to build coils smoothly onto an electric motor stator. The present invention also makes it possible to reduce the thickness of coils on stator insulator surfaces, and to prevent the conductors from separating from the insulators.

In one example of the present invention, an electric motor stator comprises multiple teeth radially arrayed and centered on a specified center axis, insulators respectively covering said multiple teeth, and multiple coils constructed by winding multiple layers of conductors on said multiple teeth starting from said insulators. In an top end section which covers an top end and forms one end in a direction along the respective center axes of said multiple teeth, said insulator is provided with multiple upper guide grooves which are arrayed in parallel to one another at a pitch approximately equal to the diameter of said conductor, and which restrict the winding position of said conductor.

In another example of the present invention, the motor stator is provided with multiple teeth radially arrayed and centered on a specified center axis, insulators respectively covering said multiple teeth, and multiple coils constructed by winding multiple layers of conductors starting from said insulators. At the top end section which covers the top end which forms one end in a direction along the respective center axes of said multiple teeth, said insulators are provided with a protruding wall which extends in the conductor laminar direction on said center axis side of said teeth, or on the opposite side of said center axis, and which is convex toward said teeth. Said protruding wall is constructed along the winding direction of said top end portion of the coil first layer conductor, and contacts said first layer to restrict the winding position of said conductor.

In yet another example of the present invention, the motor stator comprises multiple teeth radially arrayed and centered on a specified center axis; multiple teeth inside end sections disposed at the respective end sections on said center axis side of said multiple teeth, while opening on both sides of the teeth in a circumferential direction with respect to the center of said center axis; insulators respectively covering said multiple teeth; and multiple coils constructed by winding multiple layers of conductors starting at said insulators. Said insulators comprise inside end guide grooves which restrict the winding position of said conductors at the inside end sections which cover the surfaces on the side opposite to that of the respective said center axes of said multiple teeth inside end sections.

The present invention permits the smooth construction of coils. In particular, it enables the smooth construction of coils by preventing conductor mis-winding at the top end of the multiple teeth.

DETAILED DESCRIPTION OF THE INVENTION

Below preferred embodiments of the present invention will be explained with reference to figures. In the descriptions that follow, references to the positional relationships of each of the parts, or to upper, lower, right and left directions, etc. will in all cases be for the purpose of indicating positional relationships or direction in the diagrams, and will not indicate positional relationships or directions with respect to the actual machine when assembled.

First Embodiment

Overall Motor Structure

Figure 1:
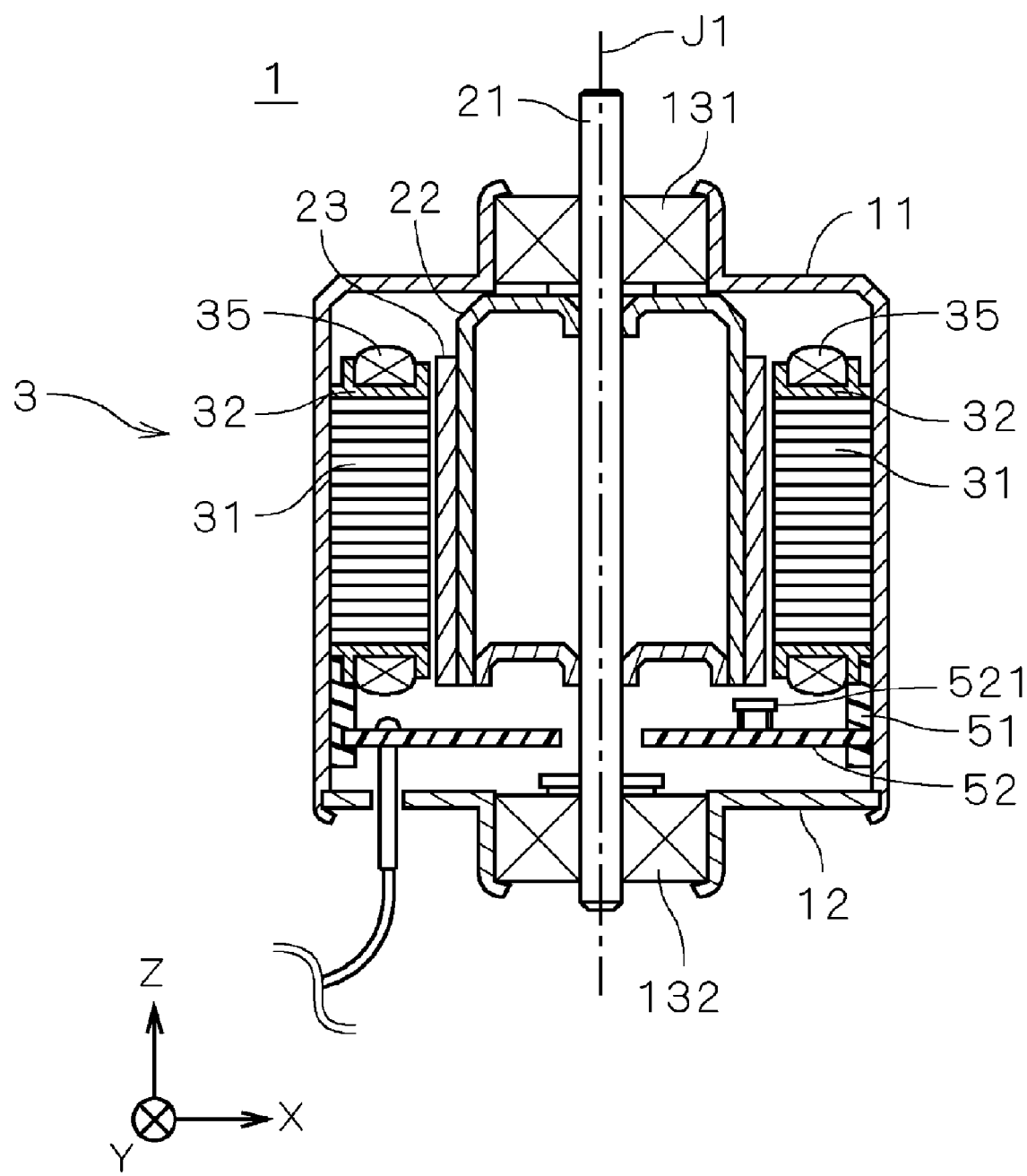
FIG. 1 is a vertical section illustrating a motor according to a first embodiment of the present invention.

FIG. 1 is a vertical section showing an electric inner rotor-type motor 1 according to a first embodiment of the present invention. In the diagram, the motor 1 is covered by a cylindrical housing 11 with a small opening on the (+Z) side and a large opening on the (−Z) side in the diagram, and by a cover plate 12, which covers all but the center section of the opening on the (−Z) side. Ball bearings 131, 132 are fit respectively onto the housing 11 (+Z) side opening and onto the cover plate 12 opening, and a shaft 21 is rotatably supported by the ball bearings 131, 132. In the explanation that follows, the (+Z) and (−Z) sides along the motor 1 center axis J1 are respectively described as the upper and lower sides for the sake of convenience, but there is no requirement that the center axis J1 necessarily conform to the direction of gravity.

A cylindrical rotor yoke 22 is attached to the shaft 21 inside the housing 11, and a multipole magnetized field magnet 23 is affixed to the outer perimeter surface of the rotor yoke 22. The stator 3 is disposed so that the center axis J1 of the annular stator 3 coincides with the center axis of the shaft 21.

The stator 3 comprises a plurality of teeth 31, arranged in a radial fashion with center axis J1 as the center (that is, extending from the inner circumferential surface of the housing 11 toward the shaft 21 (and the field magnet 23)); a plurality of insulators 32 respectively covering the plurality of teeth 31; and a plurality of coils 35, constructed by winding a conductor in multiple layers along insulators 32 on each of the plurality of teeth 31. In other words, the plurality of insulators 32 are provided respectively between the plurality of teeth 31 and the plurality of coils 35. Each of the teeth 31 is elongate in the axial direction (that is, the Z direction), and the coils 35 are formed by winding a conductor in the axially along the outer periphery of the insulator 32. Additional details of the stator 3 will be discussed later.

On the cover plate 12 side of the stator 3, a base plate attachment part 51 is affixed to the inner circumferential surface of the housing 11, and a circuit board 52 is attached to the base plate attachment part 51 so as to be positioned in between the cover plate 12, and the field magnet 23 and stator 3. The stator 3 and the circuit board 52 are electrically connected through a cross-over wire attached to the base plate attachment part 51.

In the motor, the shaft 21 and ball bearings 131, 132 perform the role of a bearing mechanism to rotatably support the rotor yoke 22 relative to the housing 11, centered on the center axis J1. The drive current supplied to the stator 3 through the circuit board 52 is controlled so that rotational power is generated between the stator 3 and the field magnet 23 centered on the center axis J1, and the shaft 21 rotates together with the rotor yoke 22.

A drive circuit for controlling the drive current supplied to the stator 3 and a Hall sensor 521 is attached to the circuit board 52 at the axial bottom side of the field magnet 23. The direction of rotation and rotational position of the field magnet 23 are detected by the Hall sensor 521 to control drive current to the stator 3. In other words, the motor 1 is what is known as a brushless motor.

Stator Structure

Figure 2:
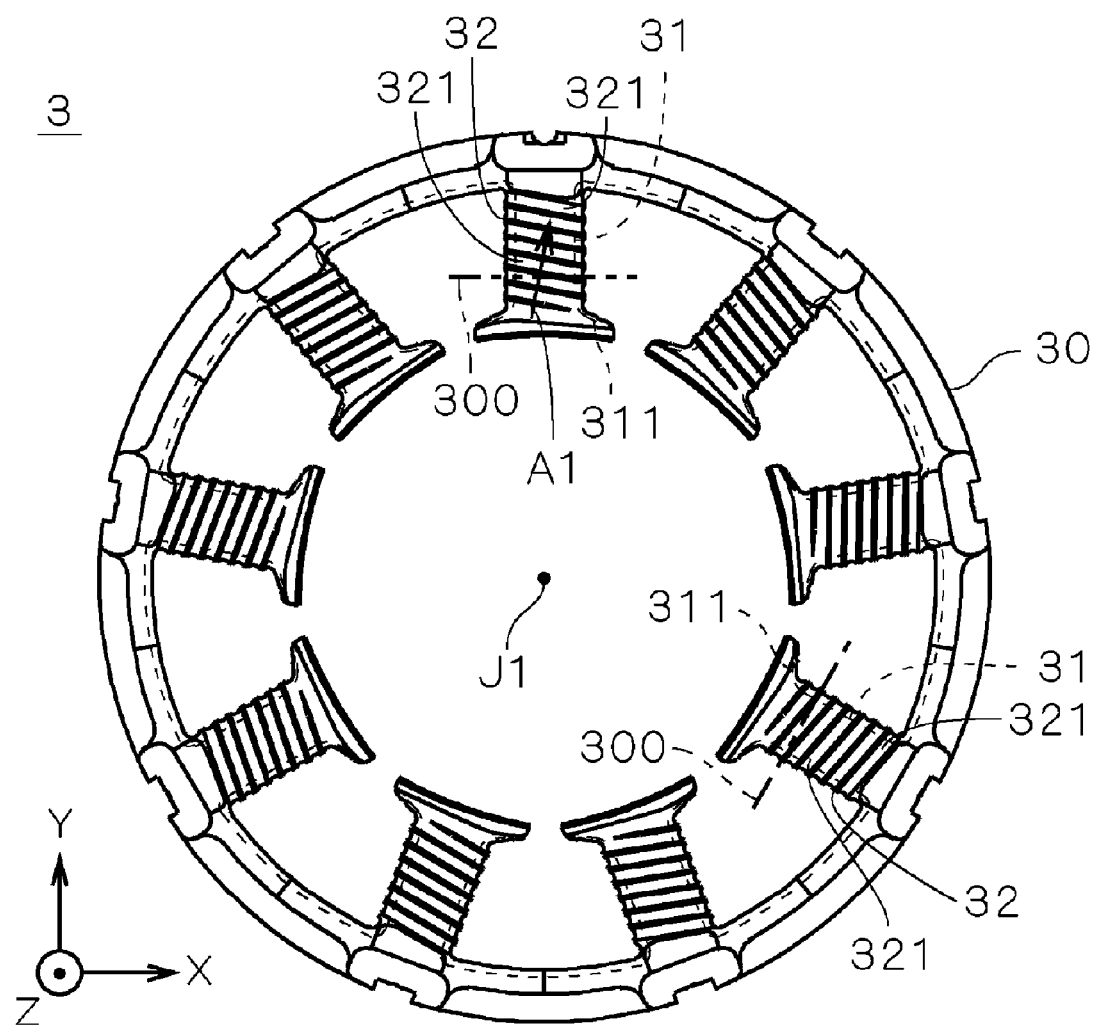
FIG. 2 is a plan view illustrating a stator.
Figure 3:
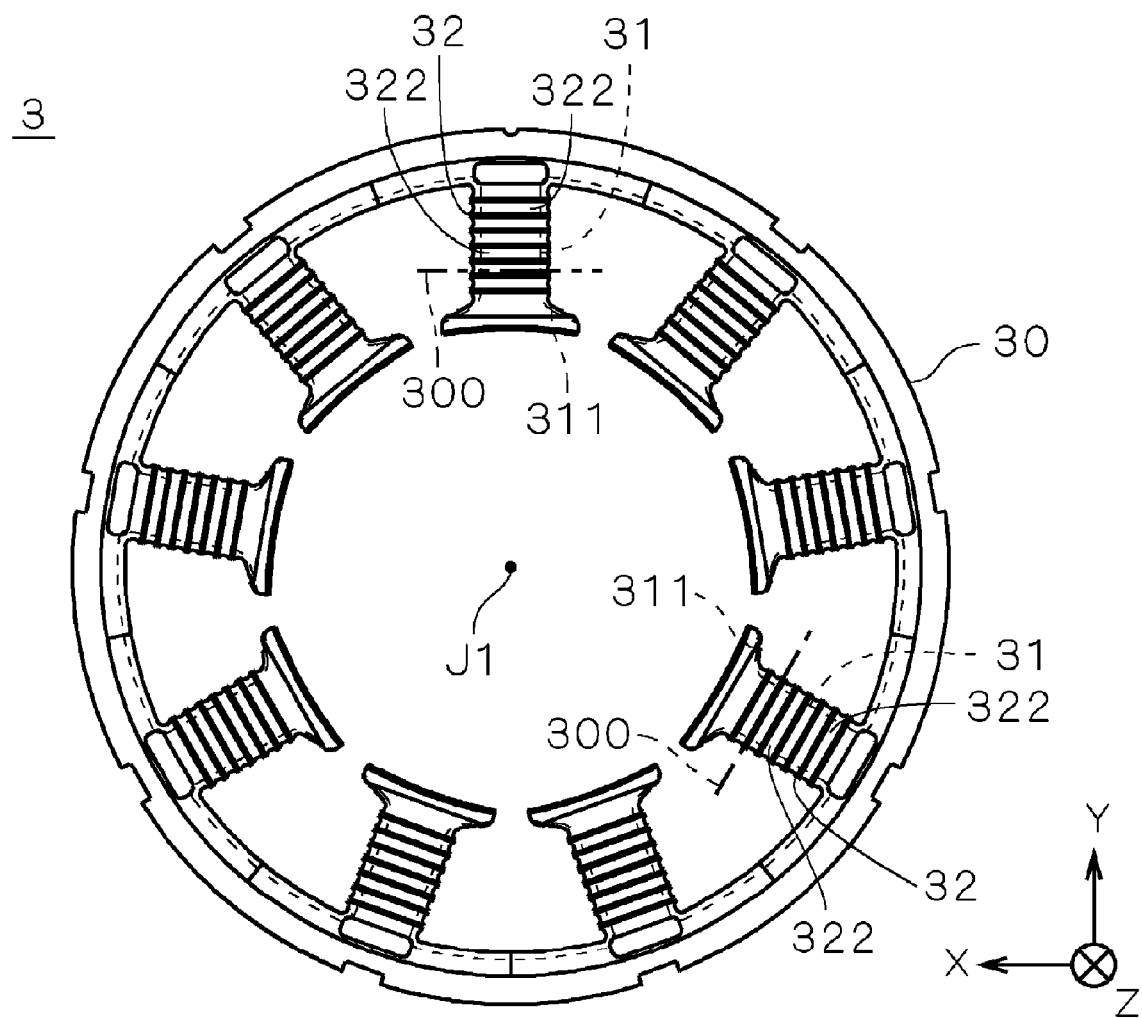
FIG. 3 illustrates the stator in a bottom view.

FIGS. 2 and 3 are a plan view and a bottom view showing the stator 3 prior to being furnished with the coils 35 (see FIG. 1). In the stator 3, the plurality of teeth 31 (9 teeth in the present embodiment) protrude radially inward from a cylindrical outside section 30, centered on the center axis J1, and at the leading end portions of the teeth 31 radially inward along each, teeth inner edge portions 311 are provided on either side of the teeth 31, circumferentially following the outside section 30 (that is, that the width in the width orientation perpendicular to the radial orientation centered on the center axis J1 is wider than the width of the teeth 31). The length paralleling the center axis J1 (along the axial orientation) of each of the teeth 31 is greater than the teeth 31 width, and both flanks of each of the teeth 31 in the circumferential orientation centered on the center axis J1 are parallel to the center axis J1.

As shown in FIGS. 2 and 3, each of the teeth 31 is covered by an insulator 32. Part of the rim surfaces of the outside section 30 on the (+Z) side and (−Z) side, and virtually the entire end surfaces on the (+Z) and (−Z) side of each tooth inner edge portion 311 are covered by the insulators 32. The teeth 31, the outside section 30, and the teeth inner edge portions 311 are formed by a plurality of silicon steel plates laminated in the Z orientation and shaped to correspond to the form of these components. The insulators 32 are provided in order to electrically isolate the coils 35 from each tooth 31 and its surroundings.

Each of the insulators 32, as shown in FIG. 2, is furnished with a plurality of first guide grooves 321 in the insulator upper end portion that covers the upper end of the tooth 31 (that is, the end portion on the (+Z) side, which forms one end in the axial direction). Arrayed in parallel at a pitch approximately equal to the diameter of the conductor that forms the coils 35 (the diameter including the coating on the conductor is preferably greater than 1.0 mm and less than 2.0 mm—in the present embodiment it is 1.5 mm), these upper guide grooves govern the wind-on position of the conductor. In an insulator 32 focused on singly, the plurality of guide grooves 321 is provided angled with respect to an imaginary plane (indicated by the dot-and-dash line in FIG. 2) 300 parallel to the center axis J1 and perpendicular to the teeth 31. The first guide grooves 321 singly are formed in an inverse "U" that stretches over the end surface and both flanks of the tooth 31 on its upper side. Here, the pitch of the first guide groove 321 refers to pitch along the perpendicular to the first guide grooves 321 (indicated by arrow A1 in FIG. 2).

Each of the insulators 32 is in turn, as shown in FIG. 3, furnished with second guide grooves 322 on its axial lower end portion (i.e., the end portion on the (−Z) side, opposite the area where the first guide grooves 321 (cf. FIG. 2) are formed). Arrayed in parallel with respect to the above-described imaginary plane 300, the plurality of lower guide grooves is formed to govern the wind-on position of the conductor. The second guide grooves 322 singly are formed in an approximate U-shape that stretches over the end surface and both flanks of the tooth 31 on its lower side. The pitch of the second guide groove 322—that is, the pitch along the perpendicular to the second guide grooves 322

(normal to the imaginary plane 300)—is equal to the pitch of the first guide groove 321.

Figure 4:
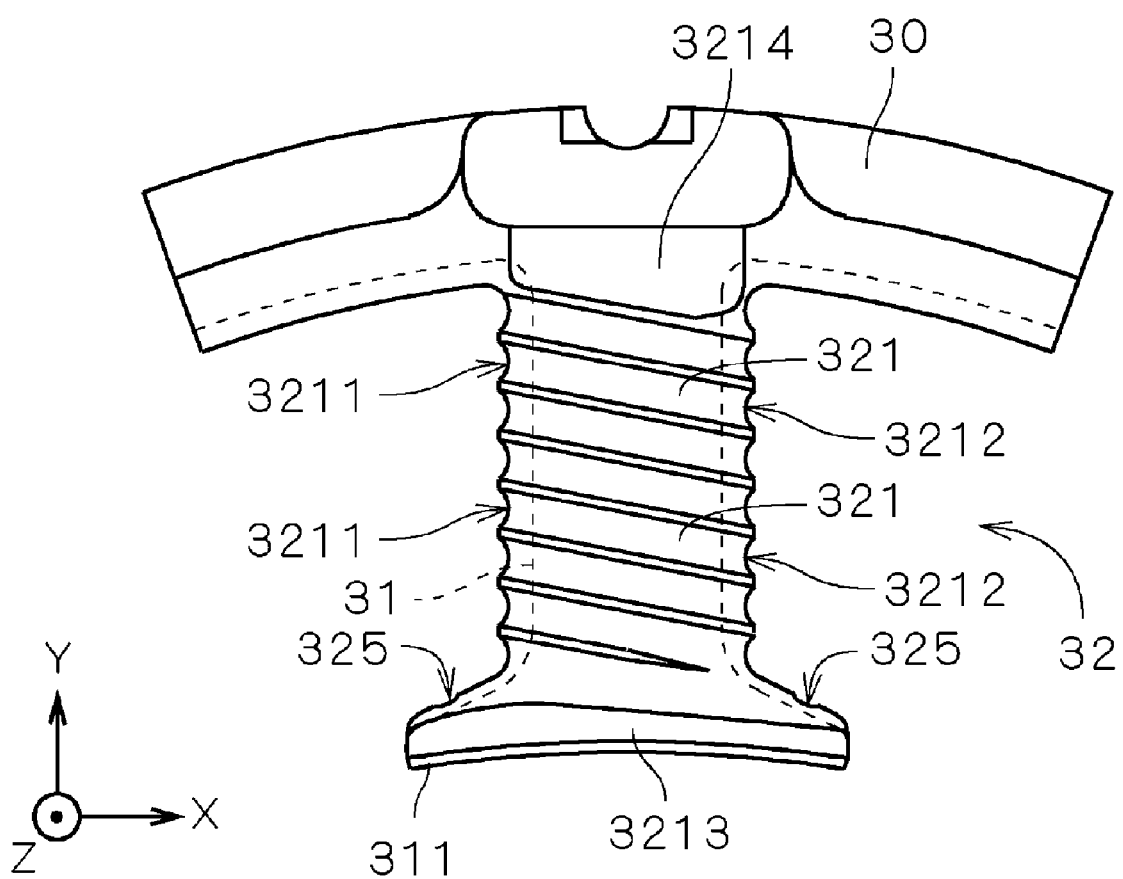
FIG. 4 is a plan view depicting an insulator.
Figure 5:
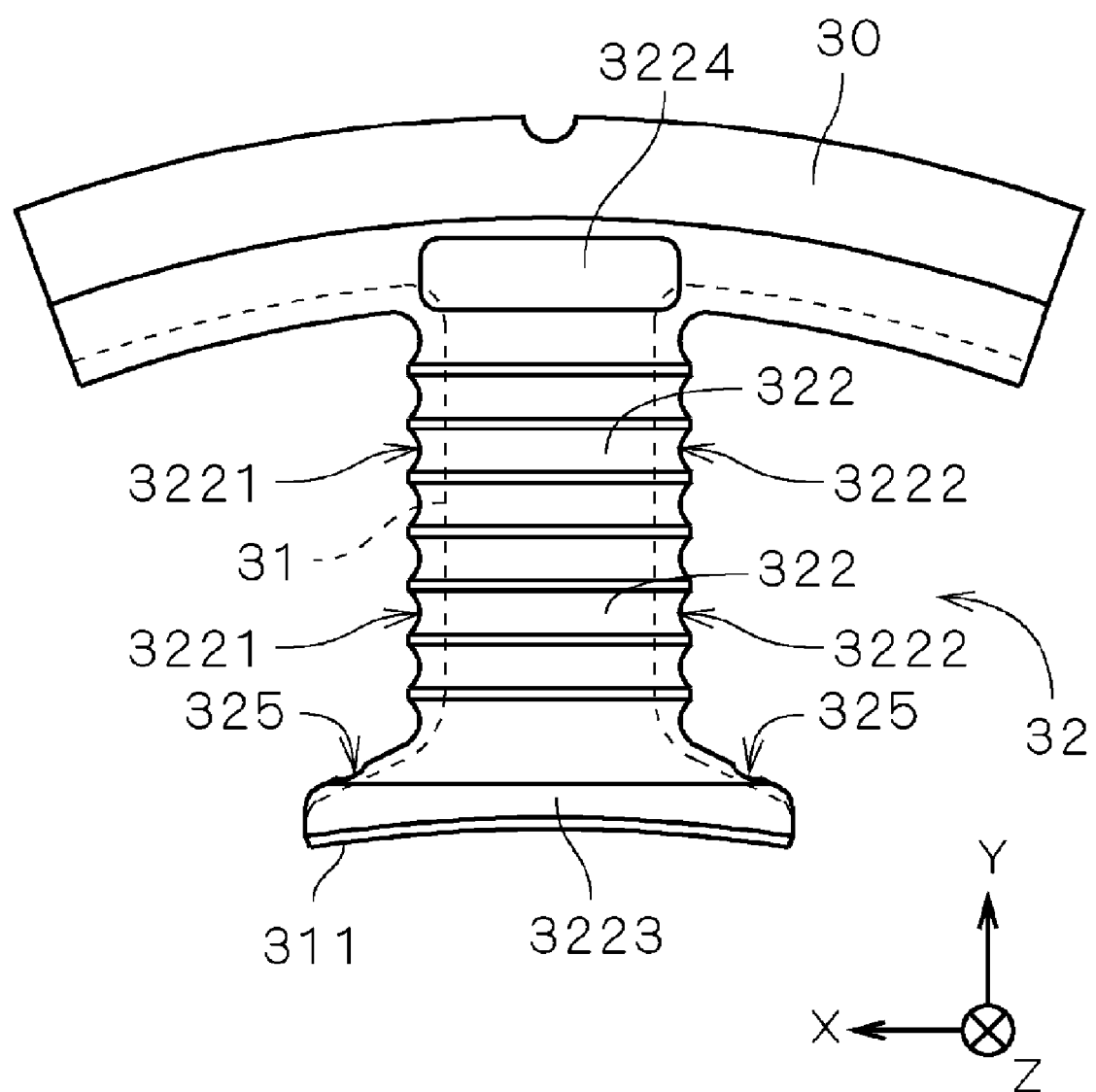
FIG. 5 depicts the insulator in an underside view.
Figure 6:
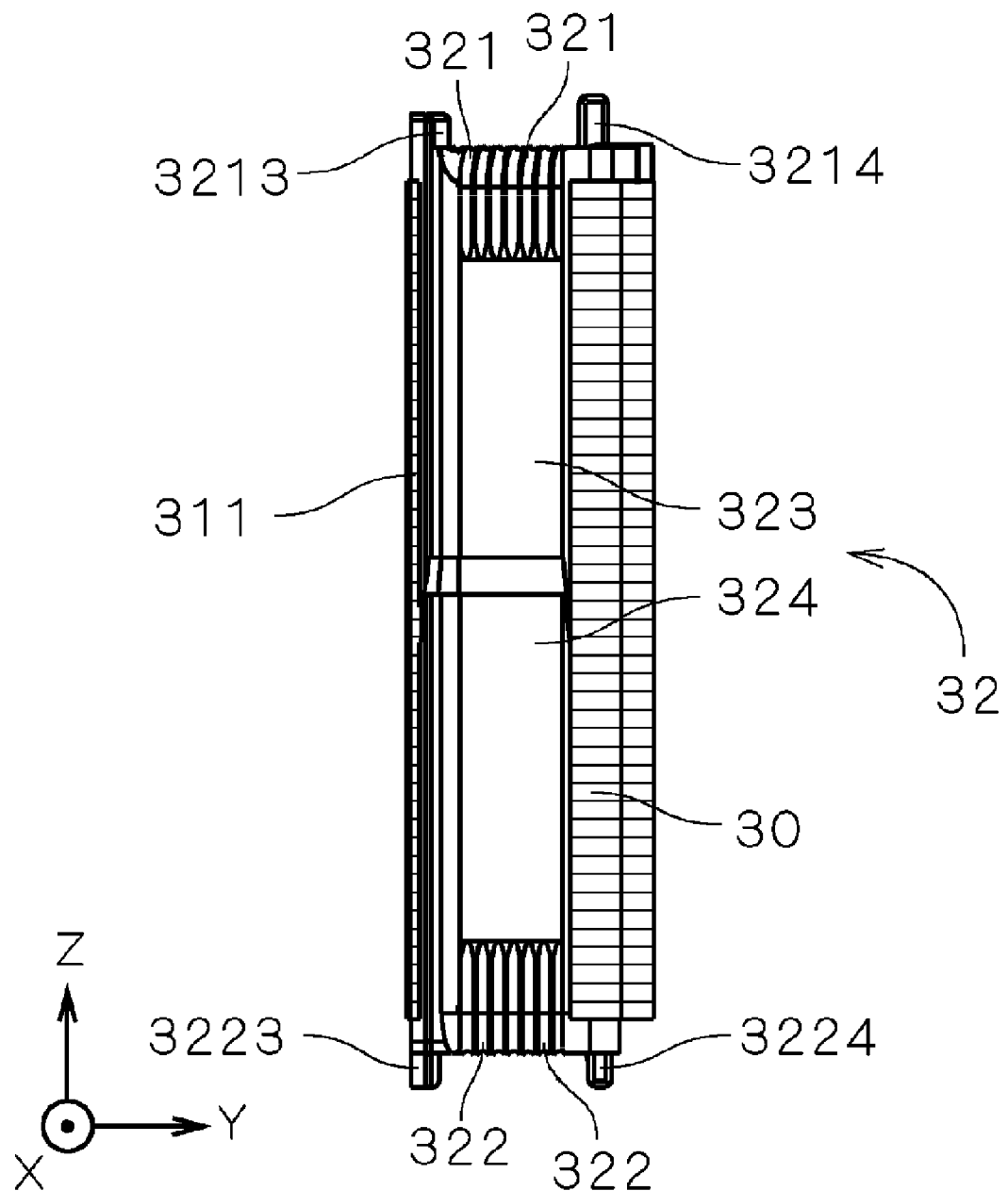
FIG. 6 illustrates the insulator in a lateral view.
Figure 7:
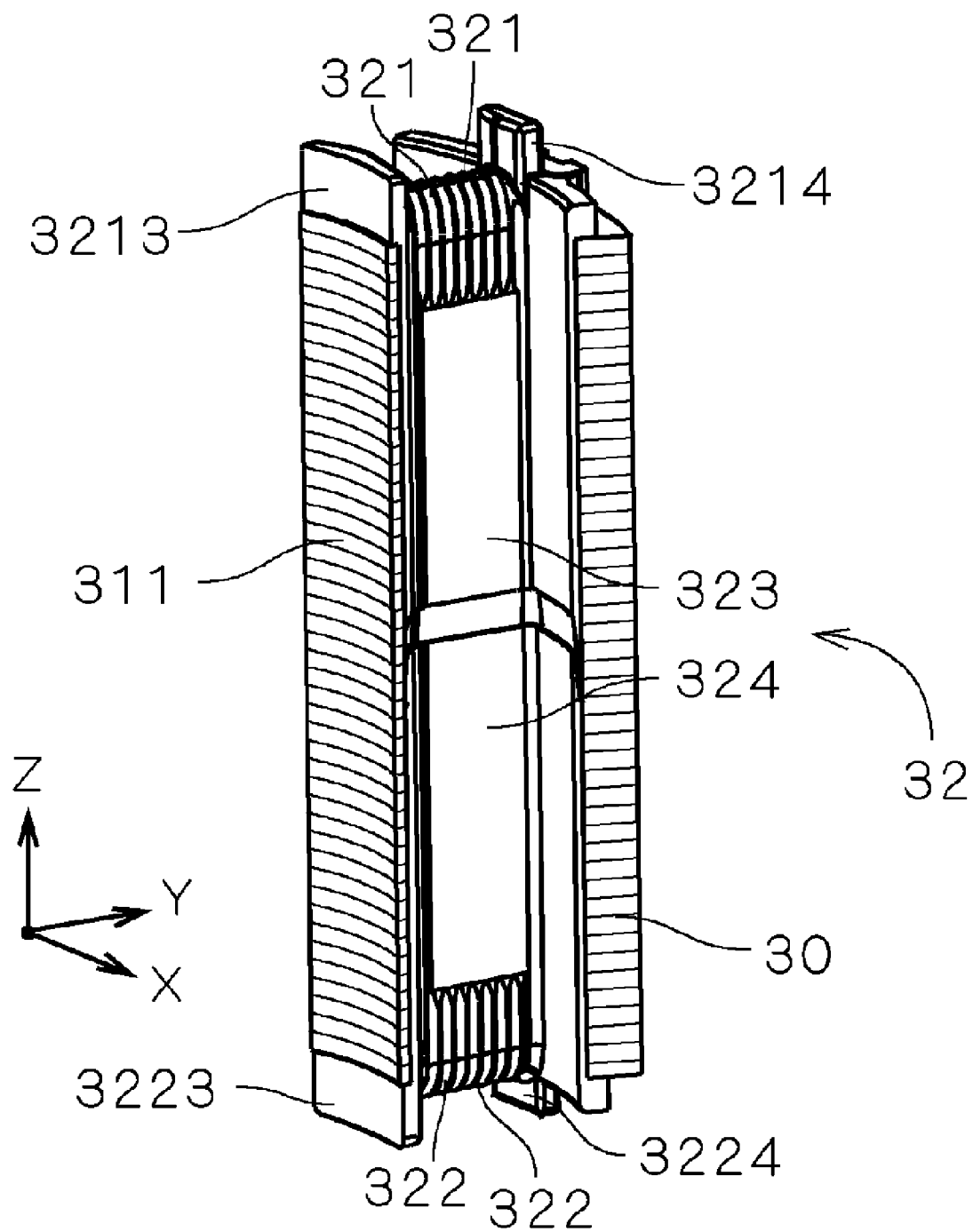
FIG. 7 is an oblique view of the insulator.

FIGS. 4 through 7 are enlarged views showing the tooth 31 and insulator 32 and vicinity located furthest to the (+Y) side in FIG. 2. FIG. 4 is a plan view of the insulator 32; FIG. 5 is a bottom view thereof; FIG. 6 is a lateral view seen from the (+X) side heading in the (–X) direction; and FIG. 7 is an oblique view thereof.

When forming a coil 35 (cf. FIG. 1), a conductor is wound onto the insulator 32 along the first guide grooves 321 from the (–X) side to the (+X) side at the upper end portion of the insulator 32 shown in FIG. 4. The first guide grooves 321 (–X) and (+X) sides will hereafter be referred to respectively as "start point 3211" and "end point 3212." At the lower end portion of the insulator 32 shown in FIG. 5, the conductor is wound onto the insulator 32 from the (+X) side to the (–X) side along the second guide grooves 322. The second guide groove 322 (–X) and (+X) sides will hereafter be referred to respectively as "start point 3221" and "end point 3222."

As shown in FIG. 4, the difference in radial distance from the center axis J1 between the respective start points 3211 and end points 3212 on the plurality of first guide grooves 321 is the same as the pitch of the first guide grooves 321 and the second guide grooves 322 (in other words, it is approximately the same as the diameter of the conductor). It will be appreciated that this just-described difference in radial distances is, precisely, the difference in vertical plumb distances from a plane that includes the center axis J1 in FIG. 2 and that is parallel to the imaginary plane 300; it will be referred below to as the first guide groove 321 "inclination." When the inclination is such that the start points 3211 are further away from the center axis J1 than the end points 3212, it is deemed to be positive. The angle of inclination of the plurality of first guide grooves 321 with respect to their respective imaginary planes 300 (FIG. 2) is preferably greater than 5° and less than 20° (10.9° in the present embodiment). As shown in FIG. 5, the distances of the respective start points 3221 and end points 3222 on the plurality of second guide grooves 322 from the center axis J1 are equal (that is, the inclination of the second guide groove 322 is zero).

As shown in FIGS. 4 and 5, for each of the respective plurality of first guide grooves 321 and second guide grooves 322 in the insulator 32, the end point 3212 of a given first guide groove 321, and the start point 3221 of a given second guide groove 322 are positioned along an axially extending straight line (that is, along a straight line parallel to the center axis J1, which extends in the Z orientation); and the end point 3222 of the given second guide groove 322 and the start point 3211 of that other first guide groove 321 that is adjacent to the given first guide groove 321 on its (–Y) side are positioned along an axially extending straight line.

In each of the insulators 32, in the inner edge portions that cover the surface on the radially outward side of the tooth inner edge portions 311, inner-edge-portion guide grooves 325 are furnished on both sides of the tooth 31, and on the upper- and lower-end tooth inner edge portions 311, to govern the conductor wind-on position of the coils 35.

As shown in FIGS. 6 and 7, the insulators 32 are provided with a first partition 323, which is a molded resin part in which plural first guide grooves 321 are formed, and a second partition 324, which is a molded resin part in which plural second guide grooves 322 are formed; the first partition 323 and the second partition 324 are installed through the (+Z) and (–Z) sides of the teeth 31 (cf. FIG. 2).

The first partitions 323 cover the upper-end surface of the teeth 31, both flanks of the parts of the teeth 31 above the center in the axial orientation, the rim surfaces on the upper end of the outside section 30, areas on the radially inward surface of the outside section 30 in the section thereof above the center, the end surfaces on the upper side of the teeth inner edge portions 311, and areas on the radially outward surface of the teeth inner edge portions 311 in the section thereof above the center.

The second partition 324 is for the most part of the same form as the first partition 323, except that its shape is the reverse of the first partition 323, and it is provided with the second guide grooves 322. More specifically, it covers the lower section of the teeth 31, the underside rim surfaces of the outside section 30 and the teeth inner edge portion 311, the radially inward surface of the outside section 30, and areas on the radially outward surface of the teeth inner edge portion 311 in the lower section thereof. The insulators 32 formed by the first partitions 323 and the second partitions 324 are sandwiched between the teeth inner edge portions 311 and the outside section 30.

Figure 8:
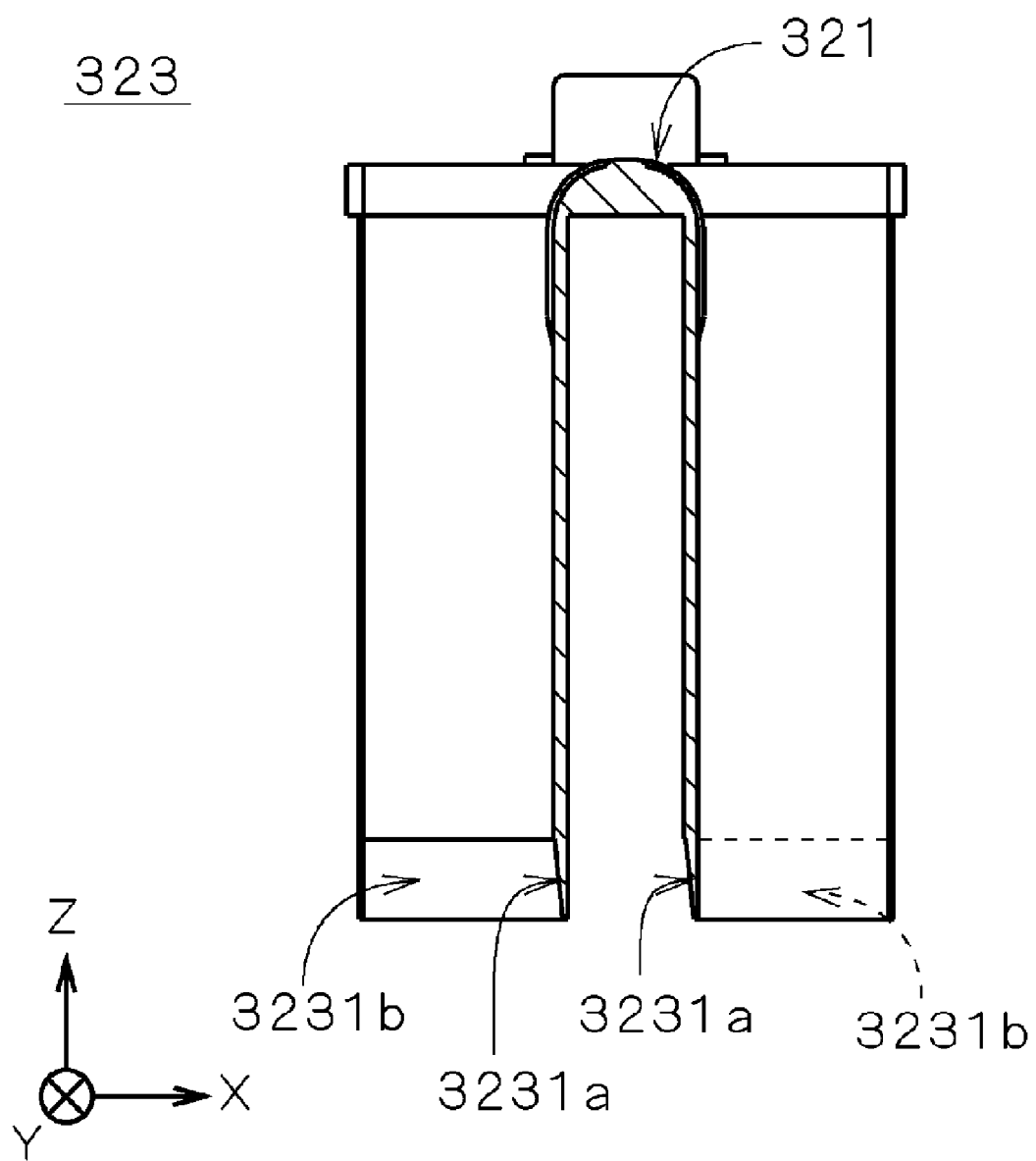
FIG. 8 is a partially sectional view depicting a first partition.
Figure 9:
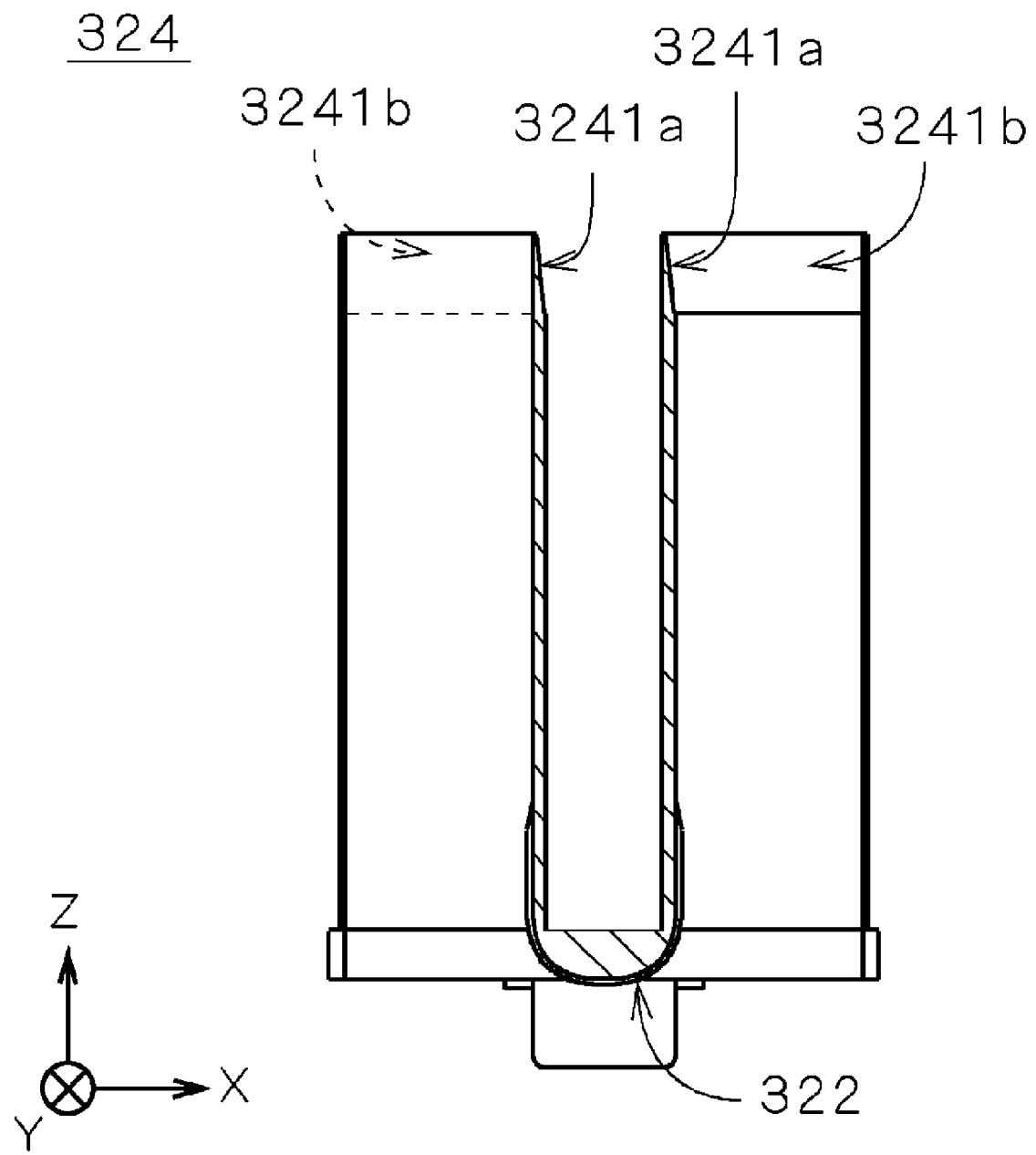
FIG. 9 is a partially sectional view illustrating a second partition.

FIGS. 8 and 9 are partially sectional views illustrating the first partition 323 and the second partition 324. The area shaded by parallel slanted lines indicates a sectional cut lying in the imaginary plane 300 of FIGS. 2 and 3 (cf. FIG. 2). As shown in FIGS. 8 and 9, provided on the (–Z) end of the first partition 323 (that is, the end toward the second partition 324) and on the (+Z) end of the second partition 324 (that is, the end toward the first partition 323), are, respectively, taper surfaces 3231a and 3241a, provided to the outer sides of each flank on the plurality of teeth 31, roughly parallel to the YZ plane, and taper surfaces 3231b and 3241b, roughly parallel to the ZX plane. When the first partition 323 and the second partition 324 are attached to a tooth 31, the taper surfaces 3231a and 3241a, and the taper surfaces 3231b and 3241b overlapping each other makes it possible to prevent a gap from arising between the first partition 323 and the second partition 324.

Of the two flanks on a tooth 31, along the outer side of the flank on which the conductor is wound heading from the second partition 324 end of the tooth toward the first partition 323 end, the first partition 323 taper surface 3231a is provided on the inner side surface of the first partition 323 (that is, the side facing the flank of the tooth 31), and the second partition 324 taper surface 3241a is provided on the outer side surface of the second partition 324 (that is, the side opposite that which faces the flank of the tooth 31). Likewise, along the outer side of the tooth 31 flank on which the conductor is wound heading from the first partition 323 end of the tooth toward the second partition 324 end, the first partition 323 taper surface 3231a is provided on the outer side surface of the first partition 323, and the second partition 324 taper surface 3241a is provided on the inner side surface of the second partition 324.

The inclination direction and angle of the taper surfaces 3231a and 3231b as seen from the first guide groove 321 side are made to be the same as the respective inclination direction and angle of the taper surfaces 3241a and 3241b as seen from the second guide groove 322 side. This contributes to designing for shared use of parts (for example, making in common part of the molding forms and part of the design data) required for the manufacture of the first partition 323 and second partition 324.

As shown in FIGS. 4 through 7, two protruding walls 3213 and 3214 are provided on the upper end of the first partition 323 for preventing the conductor being layered in the (+Z) direction onto the plurality of first guide grooves 321 from slipping out of form. The protruding wall 3213 provided on the first guide groove 321 tooth inner edge portion 311 side (that is, the teeth 31 center axis J1 side shown in FIG. 2) will be referred to as the "first inner protruding wall 3213," and the protruding wall 3214 provided on the outside section 30 side (that is, on the opposite side to the center axis J1, sandwiching the teeth 31 and the multiple first guide grooves 321) will be referred to as the "first outer protruding wall 3214." The first inner protruding wall 3213 and first outer protruding wall 3214 extend in the (+Z) direction of the conductor layering and have a convex shape facing the teeth 31 and the plurality of first guide grooves 321. A second inner protruding wall 3223 and a second outer protruding wall 3224 are provided at the lower end of the second partition 324 in order to prevent sideways slippage of the conductor layered in the (−Z) direction on the plurality of second guide grooves 322.

Figure 10:
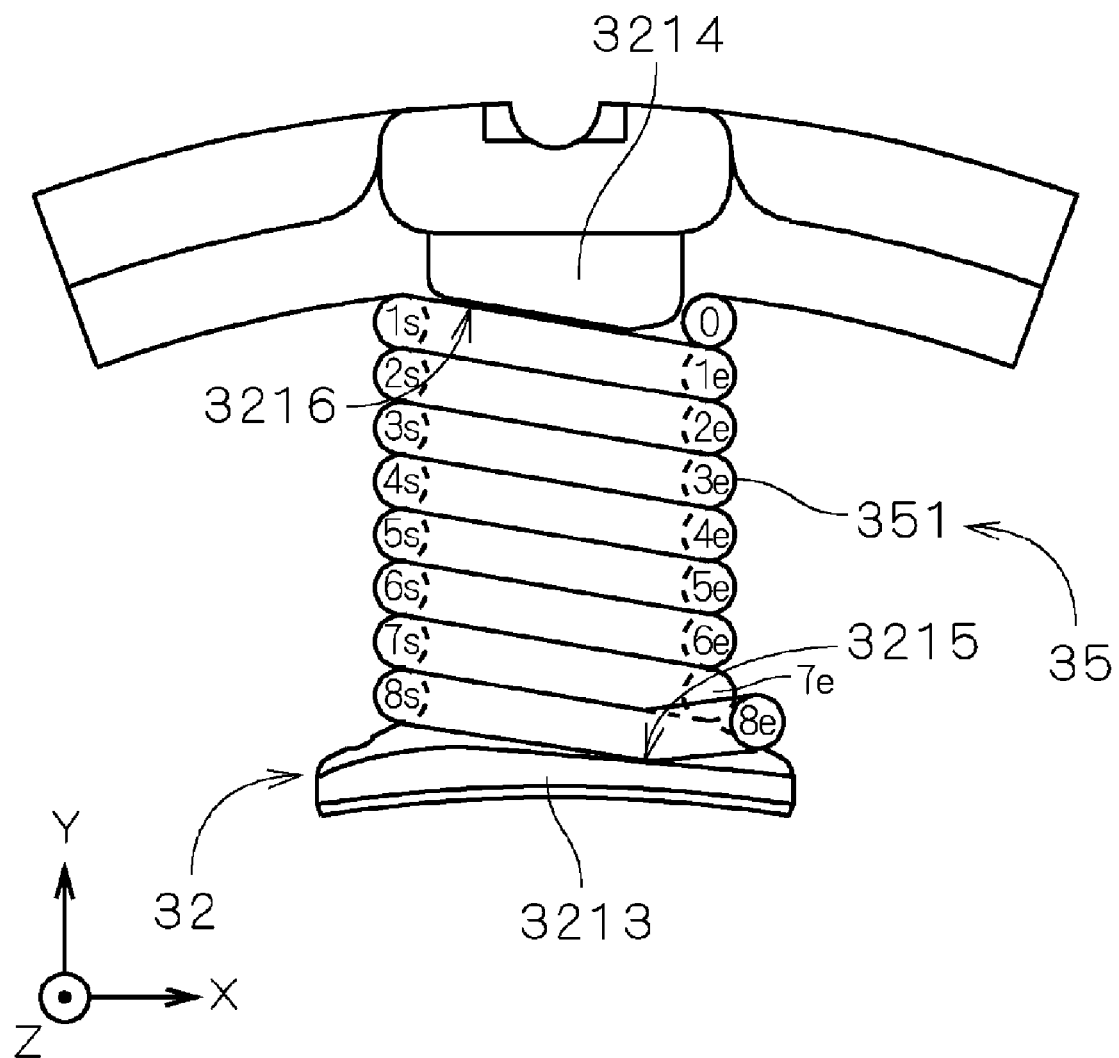
FIG. 10 is a plan view showing a coil first layer.
Figure 11:
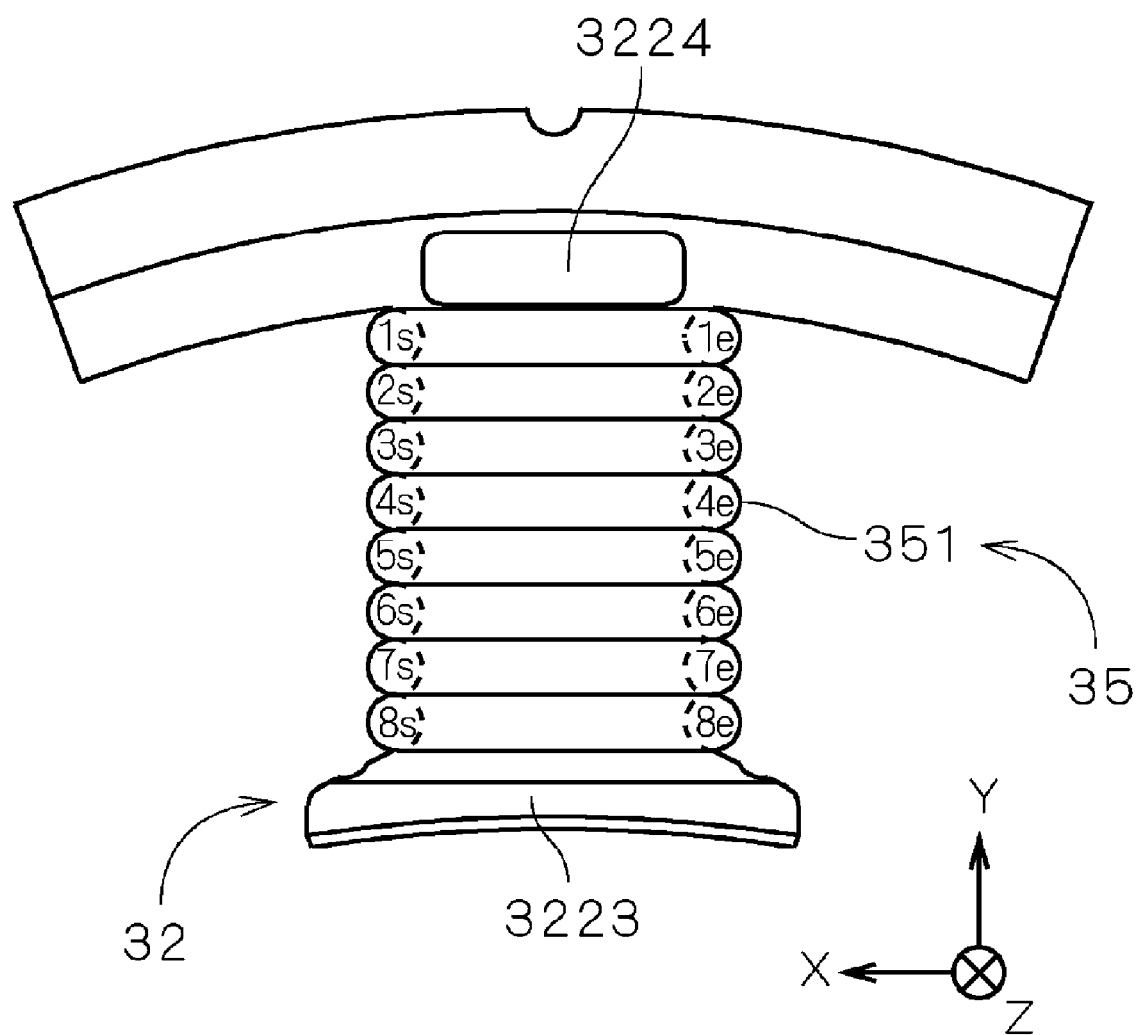
FIG. 11 is a bottom view showing the coil first layer.
Figure 12:
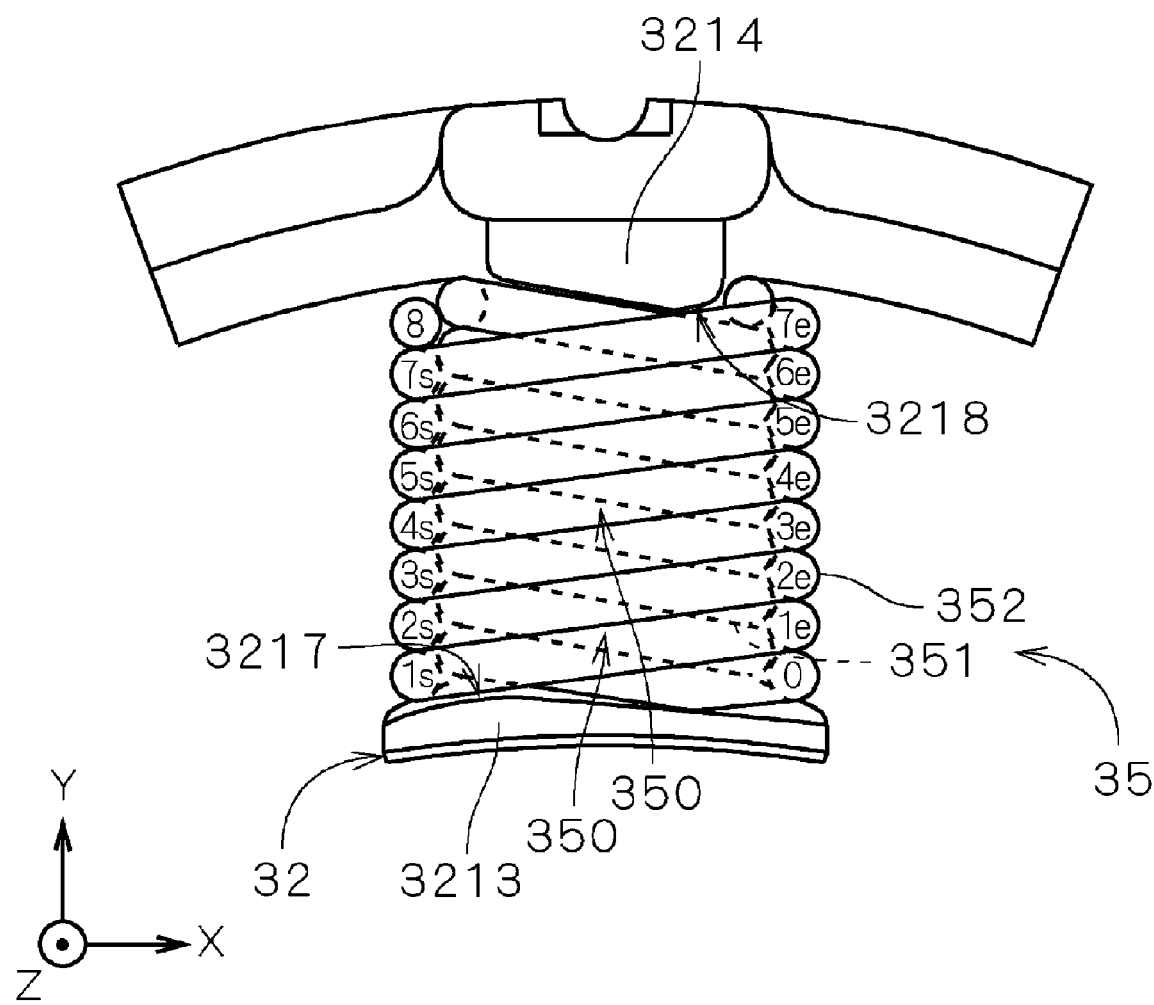
FIG. 12 is a plan view showing a coil second layer.

FIGS. 10 through 12 illustrate a conductor having been wound onto an insulator 32 to form a coil 35. As with FIGS. 4 through 7, these figures focus on a single insulator. FIGS. 10 and 11 are respectively a plan view and a bottom view showing the condition in which a first layer 351 has been formed on the coil 35. FIG. 12 is a plan view illustrating a situation in which a second layer 352 has been formed on the coil 35.

The circled reference numerals "1s" through "8s," and "0" and "1e" through "7e" in FIG. 10 show the positions of the conductor at the start point 3211 and end point 3212 in each of the first guide grooves 321. The circled reference numeral "8e" shows the position to which the conductor wound on the insulator 32 from the position marked as "8s" (referred to below simply as "position 8s") is led along the (+X) side of the insulator 32. Similarly, the circled reference numerals "1s" through "8s" and "1e" through "8e" show the positions of the conductor at each of the second guide groove 322 start points 3221 and end points 3222 shown in FIG. 5. The reference numerals cited above in FIGS. 10 and 11, as well as reference numerals "1s" through "7s" and "8," and "0" and "1e" through "7e" in FIG. 12, indicate the conductor winding sequence.

When a coil 35 is formed around the periphery of an insulator 32, the conductor is first led from position 0 in FIG. 10 toward position 1s in FIG. 11, along the insulator 32 (+X) side face in the (−Z) direction parallel to the center axis J1, and is wound onto the insulator 32 bottom end portion from position 1s toward position 1e in FIG. 11, along the second guide groove 322 (cf. FIG. 5). Next the conductor is led along the insulator 32 (−X) side face in the (+Z) direction parallel to the center axis J1, after which, by winding it from the 1s position to the 1e position in FIG. 10 along the first guide groove 321 (cf. FIG. 4) and onto the upper end portion of the insulator 32, the conductor completes one revolution around the insulator 32. At the upper end portion of the insulator 32, the conductor is led by the first guide groove 321 in a direction inclined with respect to the imaginary plane 300 (cf. FIG. 2).

Next, the conductor passes sequentially from the FIG. 10 position 1e through the FIG. 11 positions 2s, 2e, and FIG. 10 position 2s, and is wound onto the FIG. 10 position 2e. Thereafter, by similarly winding the conductor onto the insulator 32 (and the teeth 31), a coil 35 first layer 351 is formed. The coil 35 first layer 351 conductor is wound 8 times around the teeth 31 (hereafter a single turn of the conductor will be referred to as "one row"), and is wound so that adjacent conductors in the 8 rows contact one another with virtually no gap.

The coil 35 first layer 351 between positions 1s and 1e in FIG. 10 contacts the first outer protruding wall 3214 (−X) side part 3216 (referred to below as the "first layer contact part"), and between positions 8s and 8e contacts the first inner protruding wall 3213 (+X) side part 3215 (referred to below as the "first layer contact part"). The first layer contact parts 3215 and 3216 are disposed along the coil 35 first layer conductor winding direction (that is, approximately parallel to the conductor winding direction) at the upper end portion of the insulator 32; the first layer conductor is guided so as to follow the first contact part 3216 between positions 1s and 1e, and is guided along the first contact part 3216 between positions 8s and 8e. The coil 35 first layer 351, as shown in FIG. 11, also contacts the second outer protruding wall 3224, and is guided parallel to the second outer protruding wall 3224.

When formation of the coil 35 first layer 351 is complete, the conductor that forms the coil 35 second layer 352 is guided sequentially along the insulator 32 (+X) side, (−Z) side, and (−X) side to position 1s. Thereafter, the conductor that forms the second layer 352 is wound in a direction crossing the first layer 351 conductor at the upper end portion of the insulator 32, so that the first layer 351 conductor and the second layer 352 conductor cross at a crossing position 350. In other words, at the upper end portion of the insulator 32, the first layer 351 conductor and the second layer 352 conductor have differing inclinations. In the present embodiment, the first layer 351 conductor has a "positive inclination," whereas the second layer 352 has a "negative inclination."

As shown in FIG. 12, the winding-on position of the conductor in the innermost row of the coil 35 second layer 352 (that is, the row on the innermost side in the radial direction), is restricted by the inner-edge-portion guide groove 325 formed on the inner edge portion of the insulator 32 at positions 0 and 1s in FIG. 12.

The second layer 352 conductor, by being guided to lay in contact on two first layer 351 conductors adjoining each other on the (+X) flank, the lower end portion, and the (−X) flank of the insulator 32, is wound onto the insulator 32 in parallel with the first layer 351, and positioned at position 2s. That is, along the insulator 32 (+X) side and (−X) flanks, the second layer 352 conductor is accommodated in the hollow formed by two adjoining conductors from among the first layer 351 conductors which are densely wound with virtually no gaps. Thus by being guided in this hollow, the conductor is wound onto the first layer 351 in such a way that it is arrayed parallel to the first layer 351 and parallel to the center axis J1. Similarly, at the lower end portion of the insulator 32, the second layer 352 conductor is wound onto the first layer 351 such that it is arrayed parallel to the first layer 351 conductor and parallel to the imaginary plane 300 (cf. FIG. 3). Thereafter, the conductor is guided in a direction which crosses the first layer 351 conductor so that it crosses the first layer 351 conductor at a crossing position 350 and heads toward position 2e; after passing through position 2e, it is then wound in parallel to the first layer 351 conductor and reaches position 3s.

Thereafter, by winding the conductor in the same way onto the coil 35 first layer 351, the second layer 352 is formed by the eight rows of conductors arrayed in parallel to the first layer 351 conductor on each face of the teeth 31 (a section (for example, the conductor on the radially innermost row) of the eight conductor rows may cross the 351 conductor). In the coil 35 second layer 352 as well, the eight conductor rows are densely wound with virtually no gaps so that adjacent conductors contact one another.

Between the FIG. 12 positions 1s and 1e, the coil 35 second layer 352 contacts the first inner protruding wall 3213 (−X) side part 3217 (the "second layer contact part" below), and between parts 7s and 7e contacts the first outer protruding wall 3214 (+X) side part 3218 (the "second layer contact part" below"). The second layer contact parts 3217 and 3218 are disposed along the winding direction of the coil 35 second layer conductor in the upper end portion of the insulator 32 (that is, approximately parallel to the winding direction). A second layer conductor is guided between positions 1s and 1e along a second layer contact part 3217, and is guided between positions 7s and 7e along a second layer contact part 3218. The coil 35 second layer 352 also contacts the second inner protruding wall 3223 (cf. FIG. 11), and is guided parallel to the second inner protruding wall 3223. As is clear from FIGS. 10 and 12, the sectional shape of the first outer protruding wall 3214 takes a convex form toward the first guide groove 321 due to the first layer contact part 3216 and the second layer contact part 3218. The sectional shape of the first inner protruding wall 3213 takes a convex form toward the first guide groove 321 due to the first contact part 3215 and the second layer contact part 3217.

With respect to the insulator 32, the angle and surface area formed by the first inner protruding wall 3213 first contact part 3215 (cf. FIG. 10) and the second layer contact part 3217 (cf. FIG. 12), and the angle and surface area formed by the first outer protruding wall 3214 first layer contact part 3216 (cf. FIG. 10) and the second layer contact part 3218 (cf. FIG. 12) are given an appropriate size to fit the coil 35 first guide groove 321 inclination or the number of coil 35 layers, etc.

Figure 13:
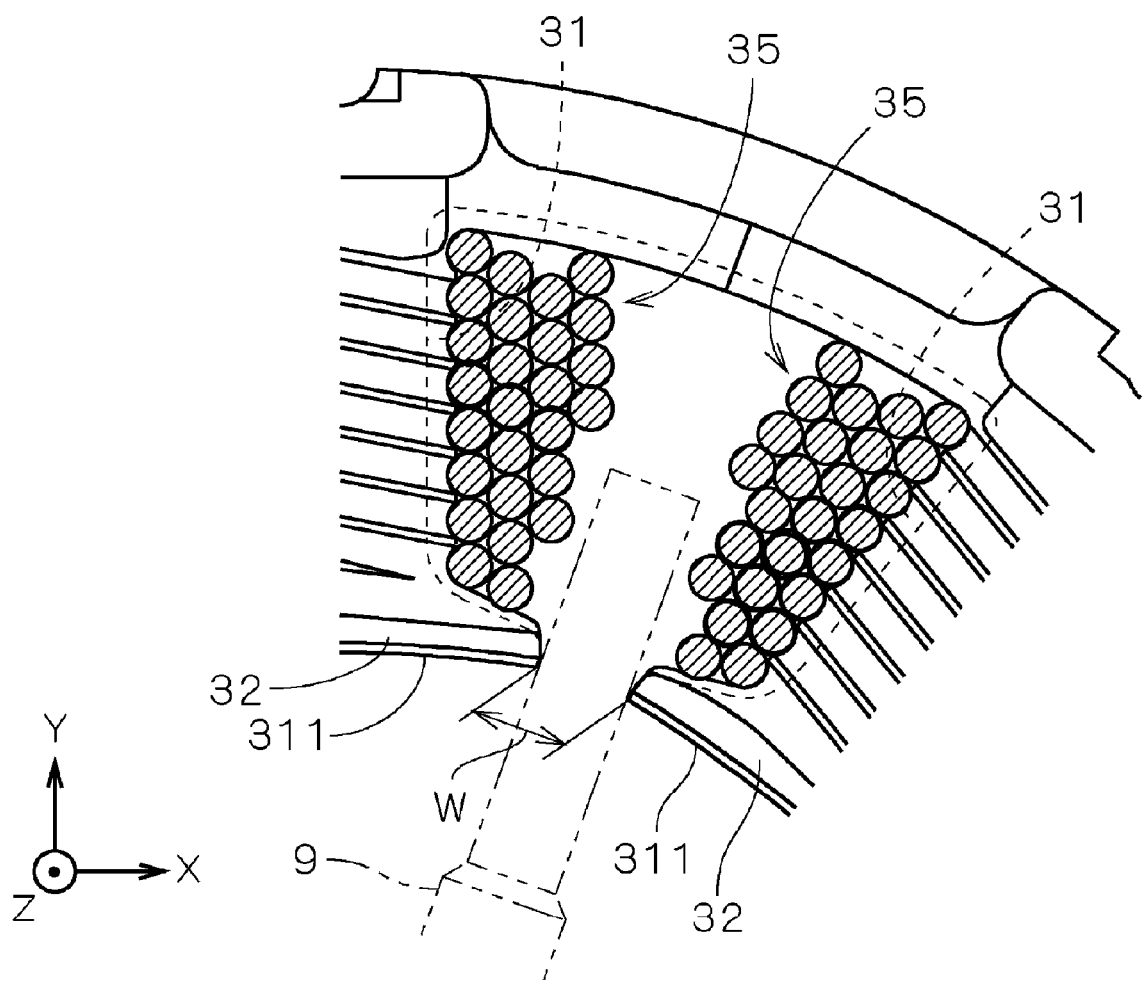
FIG. 13 is a diagram illustrating a cross-section through coils on the flanks of insulators, wherein a winding machine nozzle is represented in phantom.

Thereafter, the conductor is similarly wound until the coil reaches a specified number of layers, and a stator 3 is formed by disposing the coils 35 around each of the teeth 31 and the coils 35. FIG. 13 shows a section of the coil 35 on the insulator 32 side. As shown in FIG. 13, in the present embodiment the coils 35 are formed on each of the insulators 32 using a winding machine 9 (indicated by the phantom lines in FIG. 13). The conductor is wound around the insulator 32 across four layers within a range such that it does not interfere with the winding machine 9. The spacing between adjacent teeth 31 inner edge portions 311 is determined as the size at which the winding machine 9 nozzle can be inserted. The distance W between teeth inner edge portions 311 is preferably greater than 3 mm and less than 4 mm (more preferably, greater than 3.2 mm and less than 3.5 mm; in the present embodiment it is 3.3 mm).

As explained above, plurality of first guide grooves 321 and plurality of second guide grooves 322 to guide the coils 35 are formed in the upper and lower end portions of the insulators 32; the first guide groove 321 is disposed at an inclination of just one pitch with respect to the imaginary plane 300 (cf. FIG. 2), and the second guide groove 322 is disposed parallel to the imaginary plane 300. The end point 3212 of a single first guide groove 321, the start point 3211 of another single first guide groove 321 adjacent thereto on the (−Y) side, and the corresponding second guide groove 322 start point 3221 and end point 3222 are all positioned on a straight line parallel to the center axis J1 (cf. FIG. 2).

The coil 35 second layer 352 conductor thus crosses the first layer 351 conductor at a crossing position 350 along the upper end of the tooth 31. Furthermore, by laying in contact on two conductors that, among the first layer 351 conductors densely wound with virtually no gaps onto the flanks of the teeth 31, adjoin each other, the second layer 352 conductors are arrayed parallel to the first layer 351 conductor. Similarly, the third and fourth layer conductors cross the layers they contact below along the upper end of the teeth 31 (that is, the second and third layers), and are arrayed in parallel to the second and third layer conductors on the flanks of the teeth 31.

As a result, crossing of conductors (for example, crossing of the first layer 351 conductor and the second layer 352 conductor) on both faces of the teeth 31 (that is, both faces of the insulator 32) during winding of the conductor from the second layer 352 forward can be prevented, and the thickness of the coil 35 on both faces of the teeth 31 (the height in the X direction from the insulator 32 face in FIG. 12) can be reduced. The coil 35 can thus be formed with a high slot-fill factor and the stator 3 can be made compact. When the coil 35 is formed using a winding machine, contact can be prevented between the coil 35 already wound on an insulator 32 and the winding machine which is winding a conductor onto the adjacent 32, so that the coil 35 can be smoothly formed.

The coil 35 second layer 352 conductor is also arrayed parallel to the first layer 351 conductor at the bottom end of the teeth 31 (as is true for the third and fourth layers). Crossing of conductors at the bottom end of the teeth 31 can thus be prevented during winding of conductors from the second layer 352 forward, and the coil 35 thickness in the Z direction at the bottom end of the teeth 31 can also be reduced. As a result, a further size reduction of the stator 3 is achieved, leading to a size reduction of the motor 1.

On the stator 3, guiding of the coil 35 by the first guide groove 321 and the second guide groove 322 results in its disposition at an inclination with respect to the imaginary plane 300 at the top end of the teeth 31, making it parallel to the center axis J1 at each face of the teeth 31. It is thus possible to achieve tighter winding of the coil 35 conductor with respect to the teeth 31 compared to the case when the conductor is inclined with respect to the center axis J1 on both faces of the teeth 31.

The coil 35 first layer 351 conductor is moved to the (−Y) side by one pitch width of the first guide groove 321 and second guide groove 322 (that is, a distance approximately equal to the conductor diameter) with each revolution around the perimeter of the insulator 32. As a result, the coil 35 first layer 351 can be constructed smoothly and at a high slot-fill factor with virtually no provision of spacing between adjacent conductors. By forming the second layer 352 and forward by further winding of conductors on the first layer 351 which has been thus aligned at a high slot-fill factor, the coil 35 can be smoothly constructed and conductor miswinding avoided. A high coil 35 slot-fill factor can thus be achieved without adding complexity to the stator 3 manufacturing process.

On the stator 3 insulator 32, the first layer 351 winding is restricted by the first guide groove 321 and the second guide groove 322, therefore winding errors caused by the second layer 352 conductor becoming lodged between first layer 351 conductors, etc. can be reliably prevented, and the coil 35 can be smoothly constructed. That is, aligned winding can be achieved. Also, winding of the conductor row on the radially innermost side among the second layer 352 is restricted by the inner edge portion guide groove 325. At the radially inner end section of the teeth 31, therefore, second layer 352 conductor mis-winding caused by mis-winding of the radially innermost conductor row of the second layer 352 toward the radial inside direction can be prevented, and the coil 35 can be smoothly constructed.

At the insulator 32, the winding position at the center axis J1 side and the outside section 30 side of the plurality of layers of conductors which cross at the first guide groove 321 is guided by the first inner protruding wall 3213 and first outer protruding wall 3214, which are mutually convex facing the plurality of first guide grooves 321. Therefore the coil 35 can be smoothly constructed even at the end section of the plurality of first guide grooves 321 center axis J1 side and the outside section 30 side. The first inner protruding wall 3213 and the first outer protruding wall 3214 restrict the position and direction of winding of the first layer 351 and second layer 352 conductors by use of the first layer contact parts 3215 and 3216 and the second layer contact parts 3217 and 3218, thus achieving an aligned winding of the first layer 351 and the second layer 352, so that aligned winding of the coil 35 can be more easily realized.

On the insulator 32, the taper surfaces 3231a and 3231b are disposed on the second partition 324 side of the first partition 323, the taper surfaces 3241a and 3241b are disposed on the first partition 323 side of the second partition 324, and the taper surfaces 3231a, 3231b overlap with the taper surfaces 3241a, 3241b when winding onto the first partition 323 and second partition 324 teeth 31, thus enabling the prevention of gap formation between the first partition 323 and the second partition 324, while simplifying the assembly of the first partition 323 and the second partition 324.

Furthermore, on the insulator 32, of the two flanks on a tooth 31, along the flank on which the conductor is wound from the second partition 324 section to the first partition 323 section, the taper surfaces 3231a and 3241a are provided on the inner side surface of the first partition 323 and the outer side surface of the second partition 324. In turn, along the flank on which the conductor is wound heading from the first partition 323 section to the second partition 324 section the taper surfaces 3231a and 3241a are provided on the outer side surface of the first partition 323 and the inner side surface of the second partition 324. In other words, for the first partition 323 and the second partition 324, at the first guide groove 321 and second guide groove 322 the taper surfaces 3231a, 3231b are formed on the outside of the face on the start point 3211 and 3221-flanks, and the taper surfaces 3231a, 3231b are formed on the inside of the face on the end point 3212 and 3222-flanks. Therefore on the face at the side on which the conductor is wound from the top toward the bottom (that is, the face on the side of the first guide groove 321 end point 3212), the first partition 323 is positioned on the outside of the second partition 324 in the area of the joint between the first partition 323 and the second partition 324. On the face at the side on which the conductor is wound from the bottom toward the top (that is, the face on the side of the second guide groove 322 end point 3222), the second partition 324 is positioned on the outside of the first partition 323 in the area of the joint between the first partition 323 and the second partition 324. As a result, catching of the conductor (and the winding machine 9 nozzle) on the joint between the first partition 323 and the second partition 324 during winding of the conductor on the teeth 31 can be prevented, and the coil 35 can be smoothly constructed.

Second Embodiment

Figure 14:
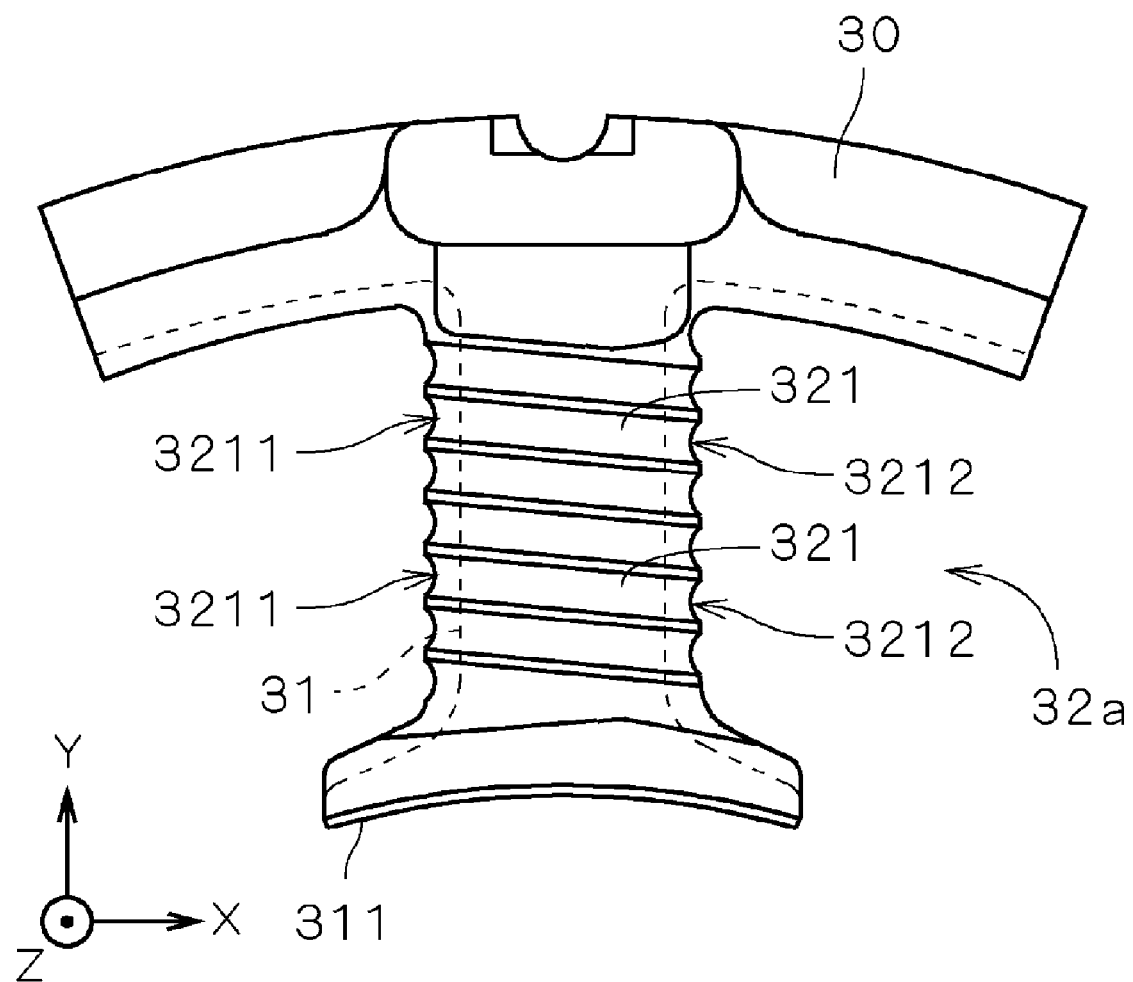
FIG. 14 is a plan view depicting a motor insulator involving a second embodiment of the present invention.
Figure 15:
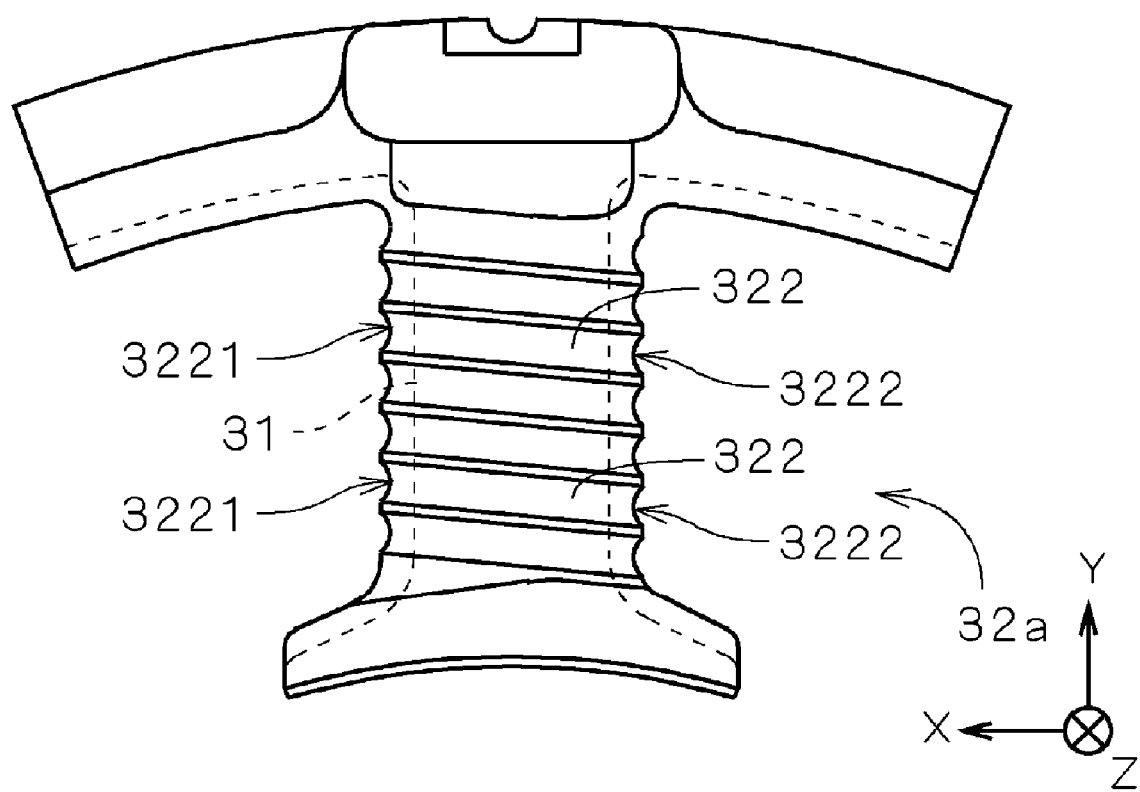
FIG. 15 illustrates the insulator in a bottom view.

FIGS. 14 and 15 are respectively a plan view and a bottom view showing the region of an insulator 32 in a motor stator according to a second embodiment of the present invention. In a motor according to the second embodiment, a plurality of insulators 32a is disposed in place of the plurality of insulators 32 shown in FIG. 1. Other structures are the same as in FIG. 1, and the same reference numerals are used in the explanation below.

In a motor according to a second embodiment, as with the motor 1 according to the first embodiment, insulators 32a are provided with a first partition 323 and a second partition 324 respectively attached on the (+Z) side and the (−Z) side of the teeth 31 (cf. FIG. 6). A plurality of first guide grooves 321 is formed at the upper end portion of the first partition 323, and a plurality of second guide grooves 322 is formed at the lower end portion of the second partition 324.

As shown in FIGS. 14 and 15, the difference in radial distance (that is, the inclination of the first guide groove 321) from the center axis J1 (cf. FIG. 2) of the plurality of first guide groove 321 respective start points 3211 and end points 3212, and the difference in radial distance from the center axis J1 of the plurality of second guide groove 322 respective start points 3221 and end points 3222 (that is, the inclination of the second guide groove 322) is equal to one half the pitch of the first guide groove 321 and the second guide groove 322. The outer protruding wall and inner protruding wall corresponding to the first partition 323 outside section 30 and teeth inner edge portion 311 extend in the (+Z) direction and have a sectional shape which is convex toward the first guide groove 321, as in the first embodiment. The insulator 32a is formed so as also to be convex toward the second guide groove 322 for the second partition 324 outer protruding wall and inner protruding wall.

Also, similar to the insulator 32 shown in FIGS. 4 and 5, for the plurality of first guide grooves 321 and second guide grooves 322, the respective single first guide groove 321 end point 3212 and single second guide groove 322 start point 3221 are positioned on a straight line extending in the Z direction (that is, on a straight line parallel to the center axis J1). The guide groove 322 end point 3222 and the start point 3211 of another first guide groove 321 adjacent to the first guide groove 321 on the (−Y) side are positioned on a straight line extending in the Z direction. As with the motor 1 according to the first embodiment, in the motor according to a second embodiment a coil 35 is constructed by winding plurality of conductor layers on each insulator 32a to form a stator 3.

In the motor stator according to the second embodiment, the shape of the insulator 32a in the region of the first guide groove 321 and the second guide groove 322 can be made the same by making the inclination of the first guide groove 321 and the second guide groove 322 equal. As a result, the same parts can be used to manufacture the insulator 32a first partition 323 and the second partition 324.

In the stator according to the second embodiment, because the coil 35 conductor is guided by the first guide groove 321 and the second guide groove 322, the conductor during winding of the second layer 352 conductor crosses the first layer 351 conductor at the upper and lower ends of the teeth 31 and is wound onto the teeth 31. Along the flanks of the teeth 31, the first layer 351 conductor and the second layer 352 conductor are aligned so as to be parallel to one another. By this means, as with the first embodiment, crossing of conductors on the two faces of the teeth 31 is prevented when winding the second layer 352 and subsequent conductor layers, and the thickness of the coil 35 on both faces of the teeth 31 can be reduced. By making the coil 35 conductor parallel to the center axis J1 on each face of the teeth 31, the conductor can be wound more densely with respect to the teeth 31.

Again, as with the first embodiment, by moving the coil 35 first layer 351 conductor by one pitch only to the (−Y) side for each revolution around the periphery of the insulator 32a, there are virtually no gaps created between adjoining conductors, and the coil 35 can be smoothly constructed with a high slot-fill factor. Because the conductor winding is restricted by the first guide groove 321 and the second guide groove 322 in the insulator 32a, conductor mis-winding can be reliably prevented and the coil 35 smoothly constructed.

Third Embodiment

Figure 16:
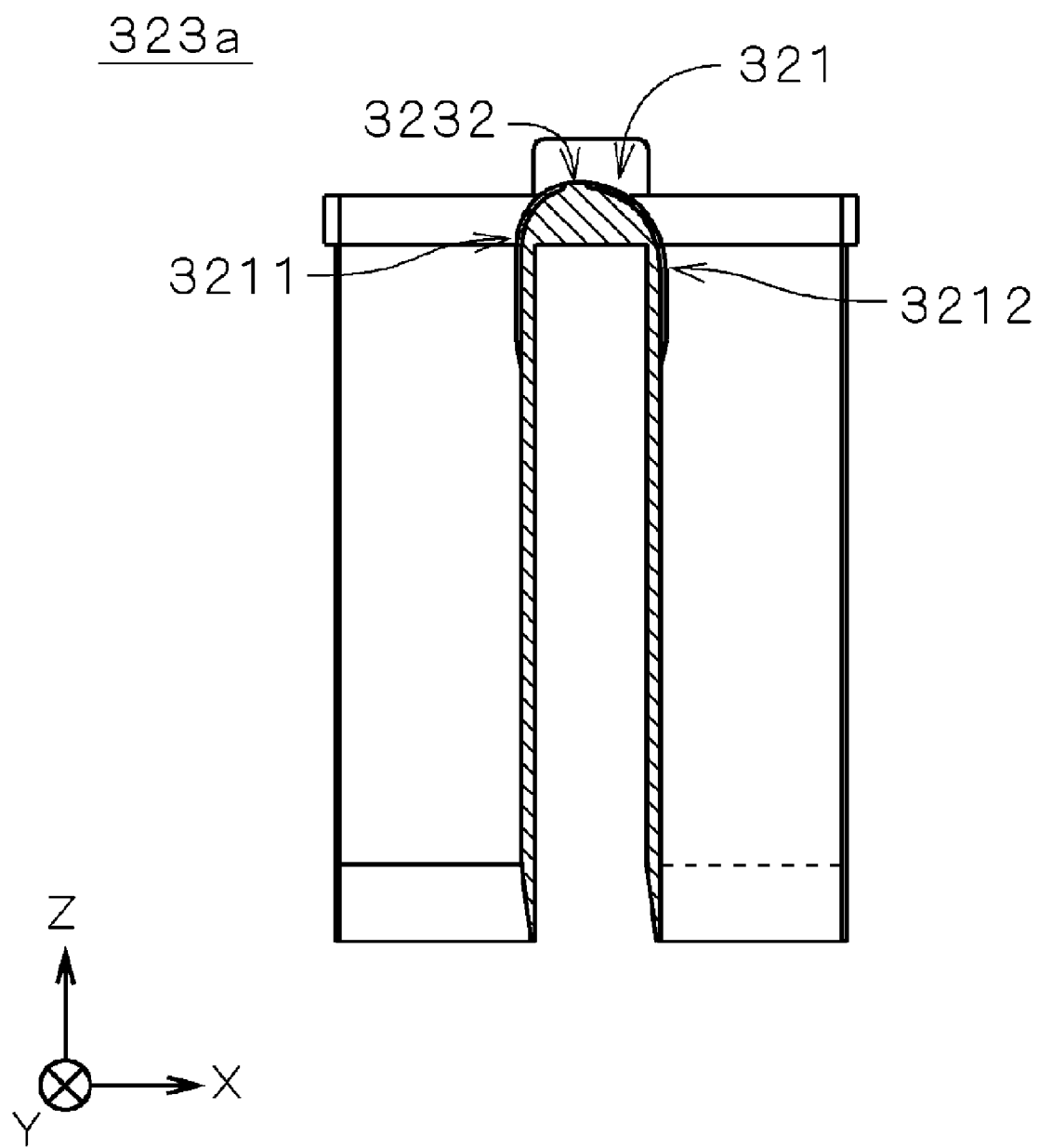
FIG. 16 is a partially sectional view showing a first partition for a motor involving a third embodiment of the present invention.
Figure 17:
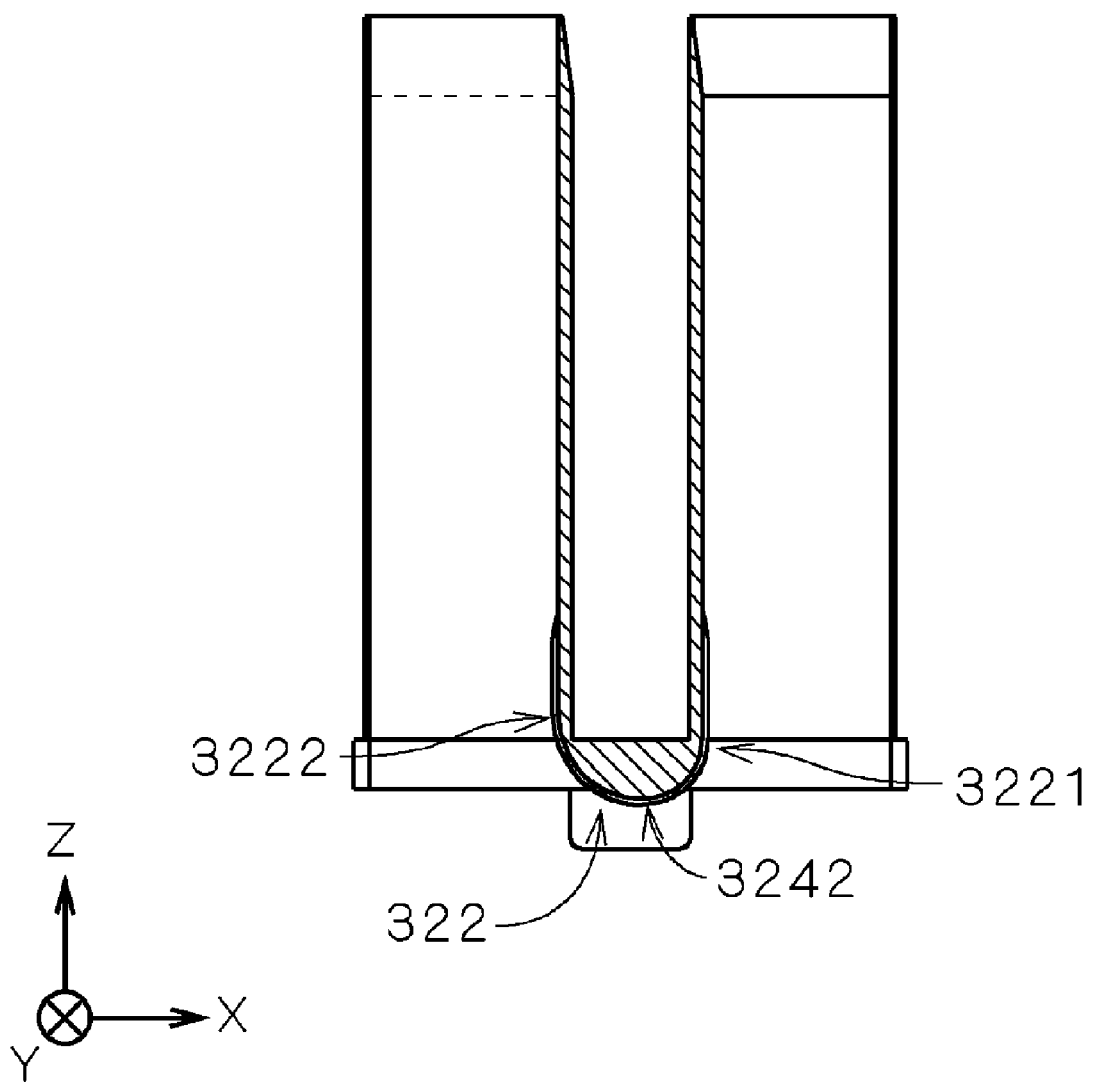
FIG. 17 is a partially sectional view depicting a second partition.

FIGS. 16 and 17 are partially sectional views showing one insulator's first partition 323a and second partition 324a in a motor stator according to a third embodiment of the present invention. The ""shaded area indicated by parallel slanted lines, as in FIGS. 8 and 9, is a section through an imaginary plane 300 (cf. FIG. 2) which is parallel to the center axis J1 and perpendicular to the teeth 31. Each of the insulators in the motor according to the third embodiment is the same as those in FIG. 1 with the exception that the sectional shape of the end section differs slightly in the direction parallel to the center axis J1. The same reference numerals are used in the explanation below.

Figure 18:
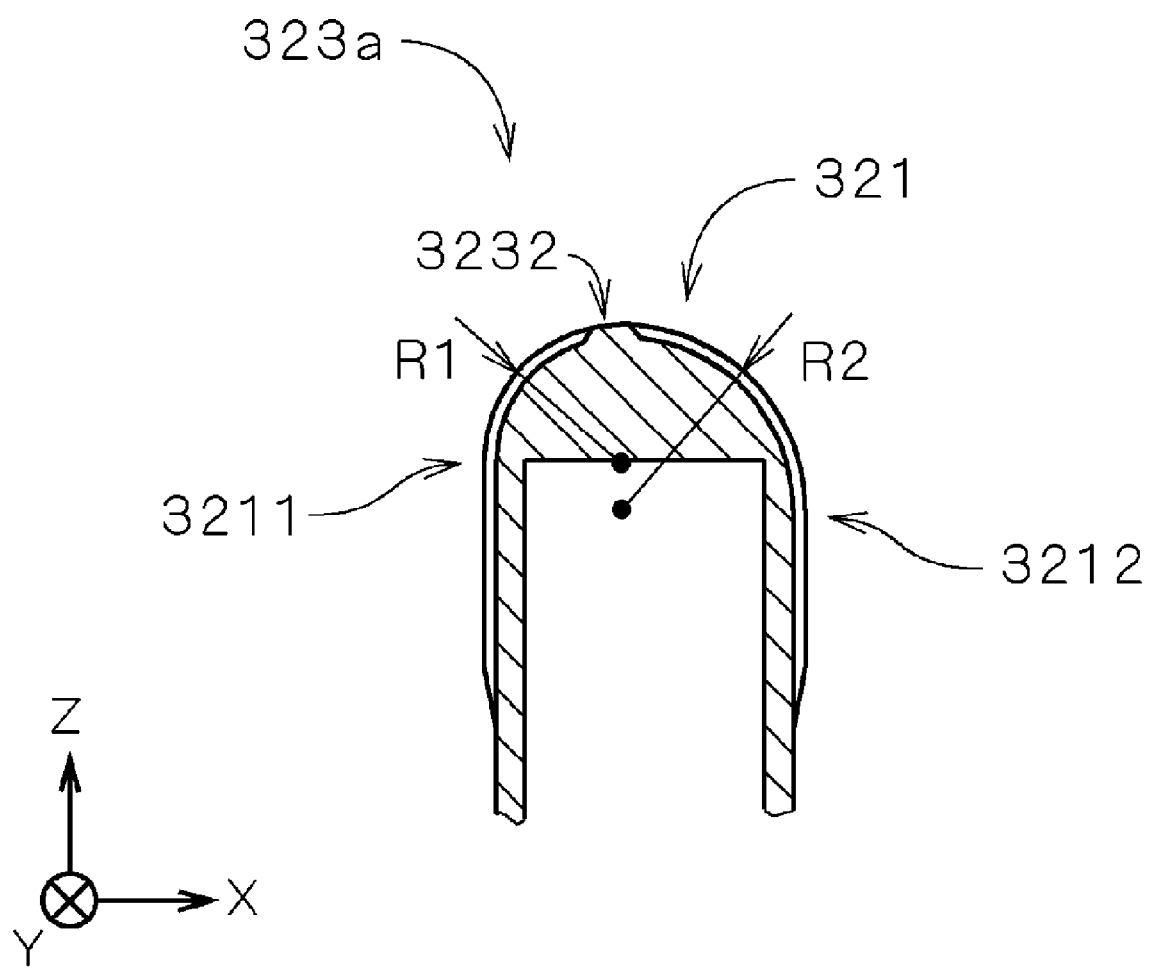
FIG. 18 is a fragmentary enlarged sectional view illustrating an end portion of the first partition.

As shown in FIG. 16, in the first partition 323a, a first crown section 3232, which is the most (+Z)-ward, distal edge of the end portion on the partition side where the first guide grooves 321 are formed, is positioned closer to the start point side than the end point side of the conductor winding (that is, closer to the first guide groove 321 start point 3211 than the end point 3212). As shown in the FIG. 18 expanded view, the cross-sectional form of the end portion on the (+Z) side of the first partition 323a has a larger radius of curvature R1 on the (+X) side (that is, on the first guide groove 321 end point 3212 side) than the radius of curvature R1 on the (−X) side (that is, on the first guide groove 321 start point 3211 side). In the present embodiment, the radius of curvature R1 is set at approximately 3 mm, and the radius of curvature R2 is approximately 4.1 mm.

As shown in FIG. 17, in the second partition 324a as well, a second crown section 3242, which is the most (−Z)-ward, distal edge of the end portion on the partition side where the second guide grooves 322 are formed, is positioned closer to the start point side than the end point side of the conductor winding (that is, closer to the start point 3221 than the end point 3222 of the plurality of second guide grooves 322). In the cross-sectional form of the second partition 324a, the radius of curvature on the end point 3222 side is greater than that on the start point 3221 side.

As explained above, in the motor insulator 32 according to the third embodiment, the bending of parts from the crown section of the first guide groove 321 and the second guide groove 322 up to the winding end point is kept gradual, without changing the width of the first guide groove 321 and the second guide groove 322 in the X direction. This makes it possible to stop the conductor from separating from the insulator 32 in the region around the first guide groove 321 end point 3212 and in the region of the second guide groove 322 end point 3222 and, by preventing mis-winding of the conductor, to smoothly construct the coil 35. The thickness of the coil 35 on both faces of the insulator 32 can also be reduced. This structure which makes it possible to keep separation of the conductor from the insulator 32 under control is particularly suited to a stator in which the axial length of the teeth 31 is longer than the width thereof, and in which the radius of curvature at the top and lower end portions of the insulator 32 is relatively small.

It will be appreciated that it is acceptable for the end section at which the radius of curvature varies to be only one of the end sections from the first guide groove 321 side and the second guide groove 322 side. "Radius of curvature" at the start point and the end point sides refers to an approximate radius of curvature. For example, it can be interpreted as an average radius of curvature, and can also be interpreted as a minimum radius of curvature on the start point and end point sides.

While several preferred embodiments of the present invention have been explained, the present invention is not limited to the foregoing embodiments, and may be variously modified.

For example, for the stator 3 insulator, the first guide groove 321 can be set to be parallel to the imaginary plane 300, and the second guide groove 322 can be disposed so as to be inclined by just one pitch with respect to the imaginary plane 300, so that the coil 35 is formed such that conductors cross only at the bottom end of the teeth 31.

In the stator 3, a high slot-fill factor coil 35 can be constructed by winding the coil 35 conductor in such a way that it is parallel to the center axis J1 on each face of the teeth 31 and moves by just one pitch unit for each revolution around the insulator. Thus from the standpoint of building the coil 35 at a high slot-fill factor, the total respective inclinations of, for example, the first guide groove 321 and the second guide groove 322 do not have to be equal to the pitch. For example, the respective inclinations of the first guide groove 321 and the second guide groove 322 could be set at a 0.7× and 0.3× the pitch.

From the standpoint of improving the coil 35 slot-fill factor, it is preferable that the inclination of the first guide groove 321 and the second guide groove 322 be greater than 0, and that it be less than the pitch of the first guide groove 321 and the second guide groove 322. In other words, it is preferable to make the difference in distance from the center axis J1 to the first guide groove 321 start point 3211 and end point 3212, and the difference in distance from the center axis J1 to the second guide groove 322 start point 3221 and end point 3222 be less than the pitch of the first guide groove 321 and the second guide groove 322.

For the stator 3, speaking only from the standpoint of reducing the coil 35 thickness at both faces of the teeth 31, it is sufficient for the various coil 35 layers to be mutually aligned in parallel and to be wound along approximately the center axis J1; they may be slightly inclined with respect to the center axis J1. Therefore when the coil 35 is formed so that the conductors cross only at the top end (and/or the bottom end) of the teeth 31, then for example the first guide groove 321 and the second guide groove 322 may be disposed in parallel to the imaginary plane 300. In that case, the coil 35 conductor is disposed so as to be slightly inclined with respect to the center axis J1 at both sides or at one side of the teeth 31. For a conductor inclination at both faces of the teeth 31, that inclination is equal to one pitch unit of the first guide groove 321 and second guide groove 322.

A reduction in the coil 35 thickness can be achieved on both faces of the teeth 31 even in cases where, for example, one or two rows of a conductor among the eight conductor rows of the coil 35 second layer 352 cross the first layer 351 conductor on the various faces of the teeth 31. Thus, by virtue of the majority of conductor rows in each layer being mutually aligned in parallel with the conductors in adjacent layers on each face of the teeth 31, the thickness of the coil 35 can be reduced on both faces of the teeth 31, even in cases in which some conductors cross on the face of teeth 31 with the conductors of an adjacent layer.

A guide groove which joins the first guide groove 321 start point 3211 and the second guide groove 322 end point 3222, and a guide groove which joins the first guide groove 321 end point 3212 and the second guide groove 322 start point 3221 may be constructed on a face of the insulator. The conductor which forms the coil 35 first layer 351 may also be wound from the center axis J1 side to the outside section 30 side with respect to the insulator.

In cases where it is possible to prevent mis-winding of the conductor and smoothly construct the coil 35 by slackening the conductor winding to some degree with respect to the teeth 31 so as to cause the conductors to cross only at the top end (and/or bottom end) of the teeth 31, the insulator first guide groove 321 and/or second guide groove 322 may be omitted. In cases where mis-winding of the conductor row on the radially innermost side of the second layer 352 is reliably prevented by contact, etc. with the first inner protruding wall 3213, the insulator 32 inner edge portion guide groove 325 may be omitted.

Insulators attached to plurality of (nine in the present preferred embodiment) teeth 31 may be comprised of nine first partitions 323 connected or integrally formed in an annular shape, and nine second partitions 324 connected or integrally formed in an annular shape. The insulator is not limited to being formed by attachment of a resin-molded first partition 323 and second partition 324 to the teeth 31 and could, for example, be formed by molding a thermoplastic resin for the teeth 31. In such cases, the plurality of teeth 31 could be said to be covered by a single insulator. With such an insulator, plurality of first guide grooves 321 are formed on the upper end portions which cover the respective top ends of the plurality of teeth 31 (that is, the respective upper end portions of the plurality of parts which cover the respective plurality of teeth 31), and plurality of second guide grooves 322 are formed at the bottom ends which cover the respective bottom ends of the plurality of teeth 31.

The stator 3 may be a segmented type in which laminar components including the individual teeth 31 are appropriately situated—for example, in which in between adjoining teeth 31 the outside section 30 is discontinuous.

Motors provided with the stator 3 are not limited to inner rotor types; they may also be of the outer rotor type.

What is claimed is:

1. An electric motor stator comprising:
   a plurality of teeth disposed in a radial form centered about a predetermined center axis;
   insulators respectively covering said plurality of teeth, said insulators being composed of first partitions for covering a first half of said plurality of teeth from the center axially along the teeth, and second partitions for covering a second half of said plurality of teeth from the center axially along the teeth, wherein
   said first partitions, along the outer side of each of flanks, parallel to the center axis, of said plurality of teeth, are provided with a first taper surface located on a second-partition-directed end thereof, wherein along the one flank of each tooth on which said conductor is wound to head from said first half toward said second half, said first taper surface is disposed on the inner-side surface of said first partition opposing that tooth flank, and along the other flank of each tooth on which said conductor is wound to head from said second half toward said first half, said first taper surface is disposed on the outer-side surface of said first partition; and
   said second partitions, along the outer side of each flank of said plurality of teeth, are provided with a second taper surface located on a first-partition-directed end thereof, and making an overlapping fit with said first taper surface, wherein along the one flank of each tooth on which said conductor is wound to head from said first half toward said second half, said second taper surface is disposed on the outer-side surface of said second partition, opposite the side thereof opposing that tooth flank, and along the other flank of each tooth on which said conductor is wound to head from said second half toward said first half, said second taper surface is disposed on the inner-side surface of said second partition; and
   a plurality of coils provided on each of said plurality of teeth by winding conductors onto said insulators through to multiple layers.

2. A motor stator as set forth in claim 1, wherein the axial length of each of said plurality of teeth is longer than the widthwise span orthogonal to the teeth radially as centered on the center axis.

3. An electric motor comprising:
   a first assembly having a stator as set forth in claim 1;
   a second assembly disposed opposing said stator, and having a field magnet for generating between said second assembly and said stator rotational force centered on the center axis; and
   a bearing mechanism for supporting said second assembly to enable it to rotate relative to said first assembly, centered on the center axis.

* * * * *